US012704366B2

(12) United States Patent
Cyr et al.

(10) Patent No.: US 12,704,366 B2
(45) Date of Patent: Aug. 11, 2026

(54) TAPE MEASURE WITH POP OUT BLADE PRESENTATION

(71) Applicant: Stanley Black & Decker, Inc., New Britain, CT (US)

(72) Inventors: Gregory Cyr, Oakville, CT (US); Joshua P. Schafer, Wolcott, CT (US); Somen Rajkumar Jaiswal, Danbury, CT (US); Joseph T. Novak, East Longmeadow, MA (US); Matthew Christopher Green, Amherst, MA (US); Benjamin J. Green, Stamford, CT (US); Ke Lu, San Diego, CA (US)

(73) Assignee: Stanley Black & Decker, Inc., New Britain, CT (US)

( * ) Notice: Subject to any disclaimer, the term of this patent is extended or adjusted under 35 U.S.C. 154(b) by 344 days.

(21) Appl. No.: 18/601,392

(22) Filed: Mar. 11, 2024

(65) Prior Publication Data

US 2025/0283710 A1 Sep. 11, 2025

(51) Int. Cl.
*G01B 3/10* (2020.01)
*G01B 3/1007* (2020.01)
(Continued)

(52) U.S. Cl.
CPC ........... *G01B 3/1007* (2020.01); *G01B 3/102* (2020.01); *G01B 3/1056* (2013.01); *G01B 2003/103* (2013.01); *G01B 2003/1038* (2013.01)

(58) Field of Classification Search
CPC .............................. B01B 3/1007; G01B 3/102
(Continued)

(56) References Cited

U.S. PATENT DOCUMENTS 2,510,939 A * 6/1950 Carlson ................ G01B 3/1041 242/380
3,519,219 A * 7/1970 Zelnick ................ G01B 3/1005 242/380
(Continued)

FOREIGN PATENT DOCUMENTS

CN 2677866 Y 2/2005
CN 2859447 Y 1/2007
(Continued)

OTHER PUBLICATIONS

"Push Latch Mechanisms (DIY!)", Youtube, uploaded by This Old Tony, dated Jul. 12, 2020, available at <https://youtu.be/3_wPH904a_8?si=3ckONYWLkIXZ22tL>.

*Primary Examiner* — George B Bennett
(74) *Attorney, Agent, or Firm* — Pillsbury Winthrop Shaw Pittman, LLP

(57) ABSTRACT

A retractable rule assembly comprises a housing, a reel, an elongated blade, a hook, a coil spring, and a blade advancer. The reel is rotatably mounted in the housing. The elongated blade is wound on the reel and is constructed and arranged to extend outwardly through an opening in the housing. The hook is positioned on a distal end of the blade. The coil spring is configured to rotate the reel in the housing assembly in a direction to wind up the elongated blade when extending outwardly of the housing. The blade advancer is constructed and arranged to be manually engaged and moved relative to the housing and into contact with the blade and/or the reel. The blade advancer is movable against a bias of the coil spring to advance the blade in a direction that extends the blade outwardly from the housing.

20 Claims, 19 Drawing Sheets

(51) Int. Cl.
*G01B 3/102* (2020.01)
*G01B 3/1056* (2020.01)
*G01B 3/1005* (2020.01)

(58) Field of Classification Search
USPC .................................. 33/759, 760, 761, 767
See application file for complete search history.

(56) References Cited

U.S. PATENT DOCUMENTS 3,675,334 A * 7/1972 Quenot ................ G01B 3/1005 33/767
4,186,490 A * 2/1980 Quenot ................ G01B 3/1061 33/762
5,044,089 A * 9/1991 Petkovic .............. G01B 3/1005 242/405
5,395,069 A * 3/1995 Chen .................... G01B 3/1005 242/381.3
5,791,581 A 8/1998 Loeffler
6,324,769 B1 12/2001 Murray
6,453,575 B1 9/2002 Hsieh
6,467,182 B2 * 10/2002 Usami .................. G01B 3/1005 33/767
6,491,248 B1 * 12/2002 Liu ...................... G01B 3/1005 242/381.3
6,550,155 B1 4/2003 Hsu
7,131,215 B2 * 11/2006 Kang ................... G01B 3/1041 33/760
7,178,257 B2 2/2007 Kang
7,263,784 B1 9/2007 Lee
7,284,339 B1 * 10/2007 Campbell ............ G01B 3/1005 242/390.8
7,506,456 B2 * 3/2009 Hernandez ........... G01B 3/1041 33/759
7,555,845 B2 * 7/2009 Critelli ................ G01B 3/1005 33/767
7,743,523 B2 * 6/2010 Schletti .................. G01B 7/107 33/501.03
8,117,763 B2 2/2012 Delneo
8,528,222 B2 9/2013 Murray
8,782,917 B2 * 7/2014 Hunsberger ......... G01B 3/1005 33/767
8,898,922 B2 * 12/2014 Bridges ................ G01B 3/1005 33/767
9,080,849 B2 * 7/2015 Steele .................. G01B 3/1041
9,194,683 B1 * 11/2015 Deutscher ............ G01B 3/1084
9,212,882 B2 * 12/2015 Brossard ................ G01B 3/004
10,775,144 B2 * 9/2020 Ham .................... G01B 3/1005
11,022,416 B2 * 6/2021 Vitas .................... G01B 3/1003
11,662,193 B2 * 5/2023 Khangar .................. G01B 1/00 33/759
2014/0237838 A1 * 8/2014 Phelps ................ G01B 3/1084 33/770
2023/0160674 A1 * 5/2023 Khangar ............. G01B 3/1003 33/771

FOREIGN PATENT DOCUMENTS

CN 2938013 Y 8/2007
CN 101086440 A 12/2007
CN 101187539 A 5/2008
CN 203274605 U 11/2013
CN 105043359 A 11/2015
CN 105091726 A 11/2015
CN 204788381 U 11/2015
CN 204788382 U 11/2015
CN 105953673 A 9/2016
CN 205679150 U 11/2016
CN 205991753 U 3/2017
CN 104776778 B 7/2017
CN 206638107 U 11/2017
CN 107655371 A 2/2018
CN 107702610 A 2/2018
CN 211824123 U 10/2020
CN 112066834 A 12/2020
CN 212253878 U 12/2020
CN 215338123 U 12/2021
CN 215572523 U 1/2022
CN 217132001 U 8/2022
CN 218034700 U 12/2022
DE 547464 C 3/1932
DE 900616 C 12/1953
DE 2825974 A1 1/1979
DE 9205476 U1 6/1992
DE 10311103 A1 9/2004
DE 10231462 B4 4/2006
DE 10311103 B4 6/2007
EP 1956337 A1 8/2008
EP 1999430 A2 12/2008
EP 1809982 B1 3/2011
WO 2019091236 A1 5/2019

* cited by examiner

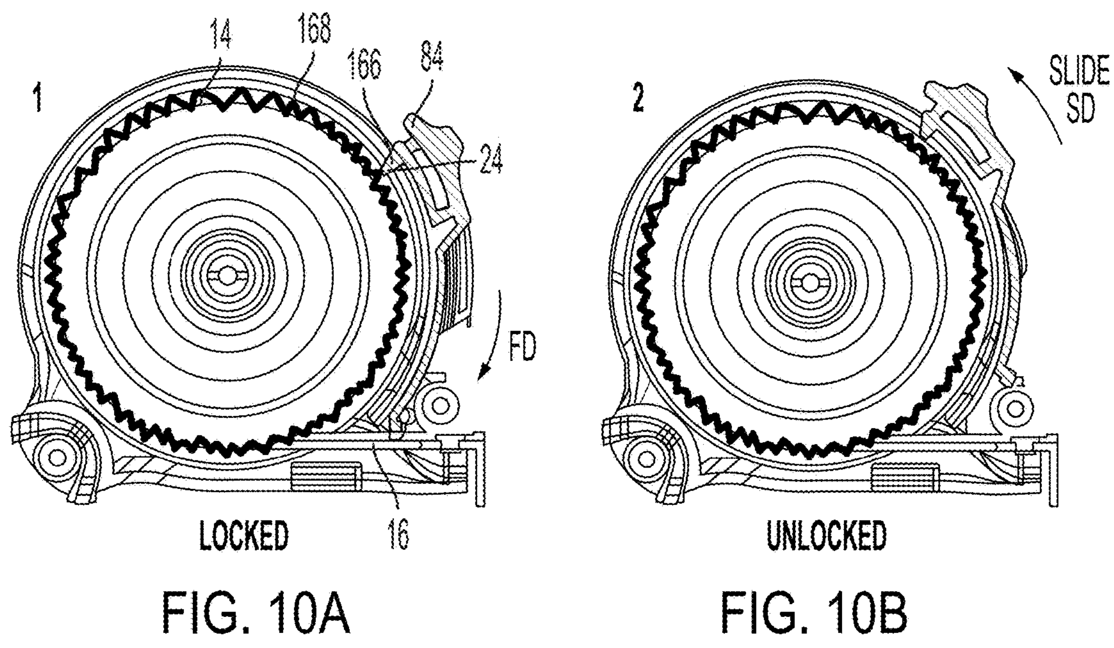
FIG. 10A
FIG. 10B
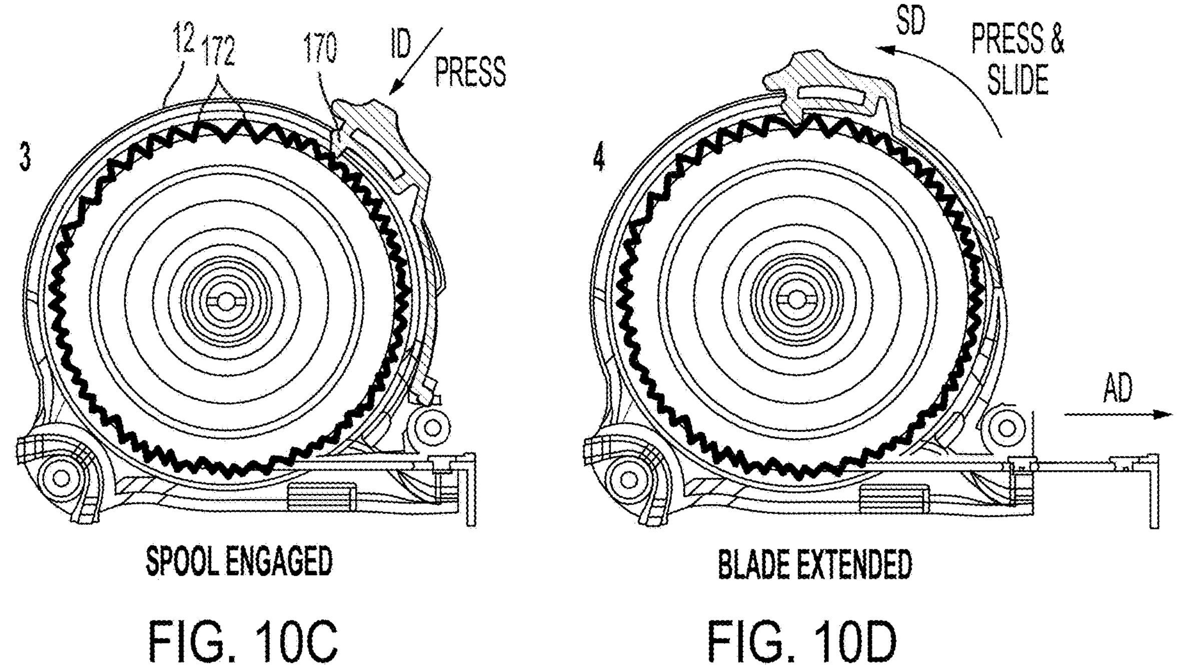
FIG. 10C
FIG. 10D

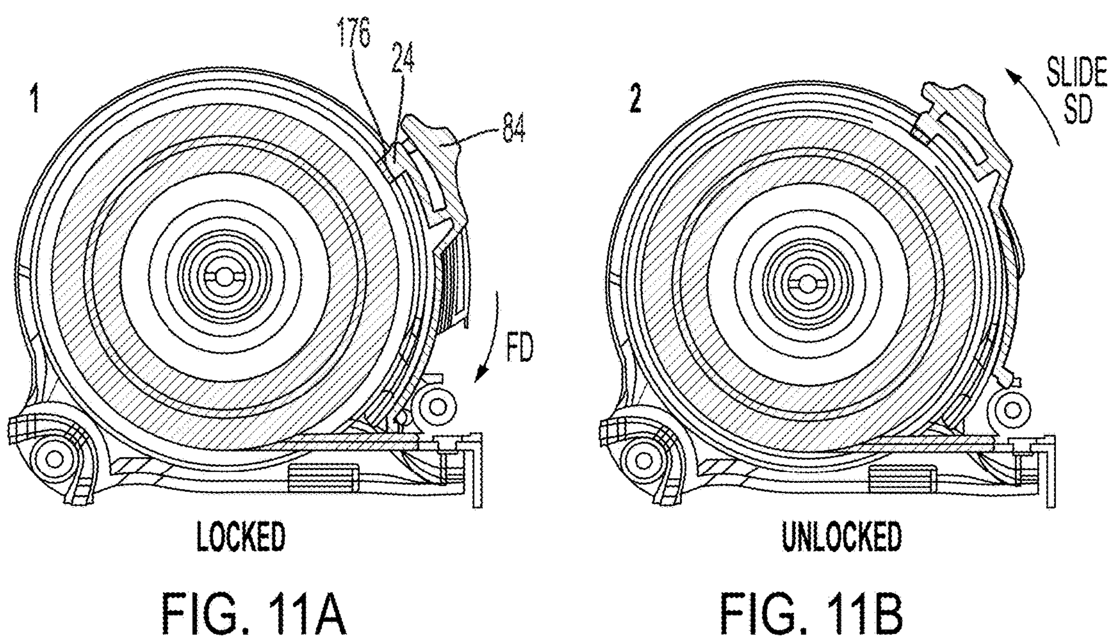
FIG. 11A
FIG. 11B
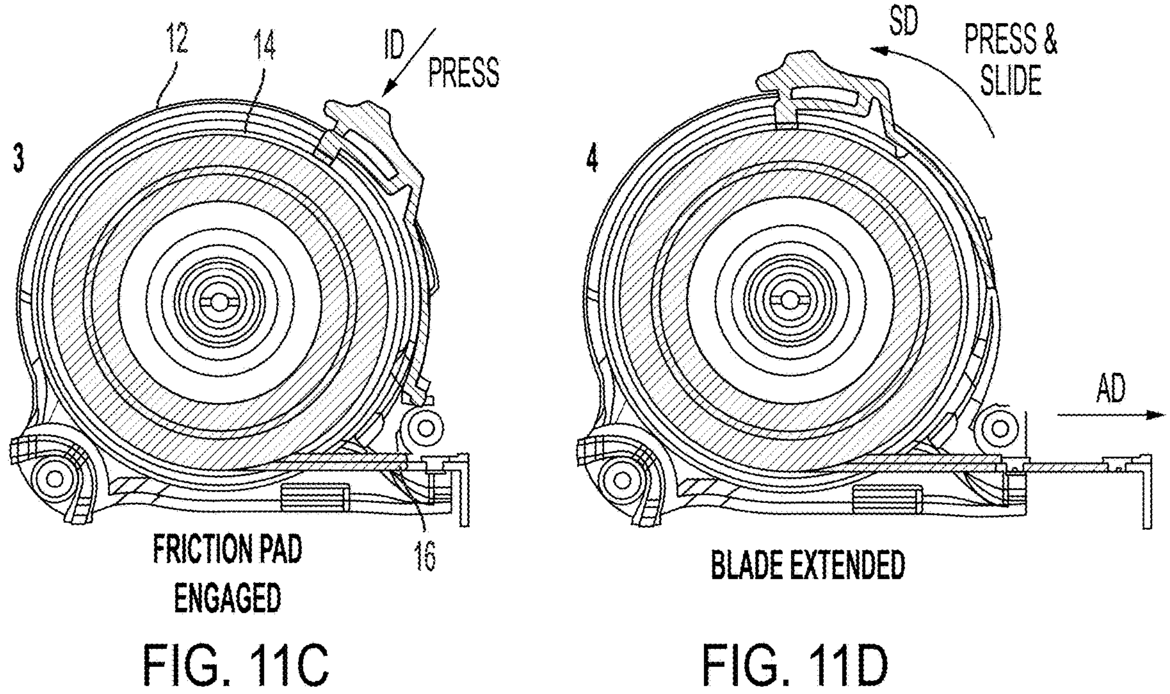
FIG. 11C
FIG. 11D

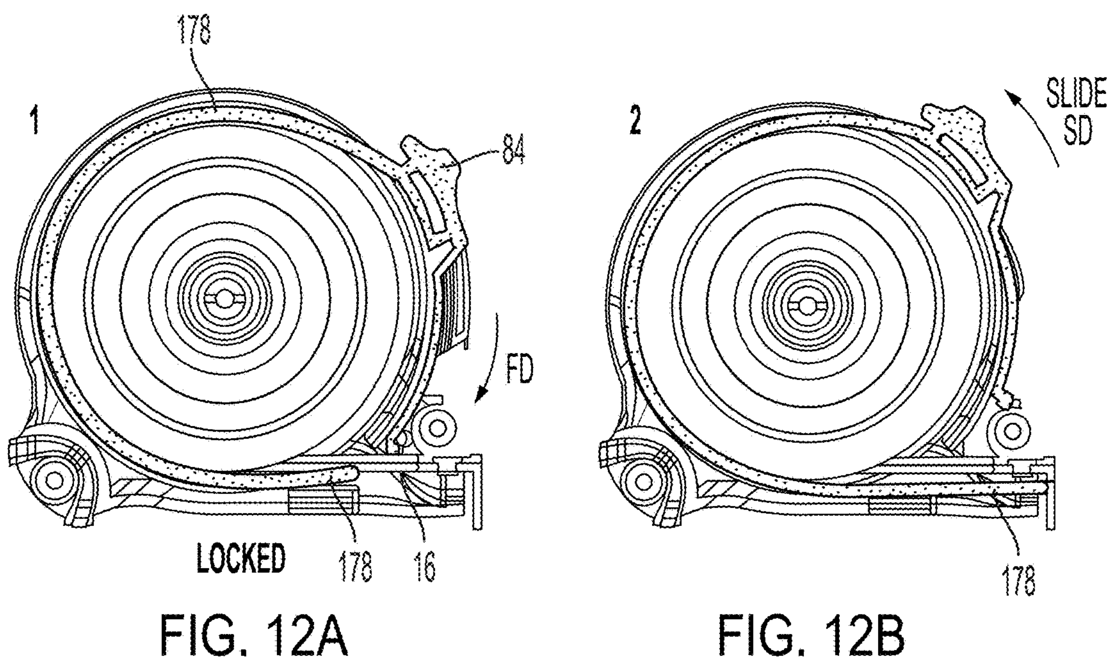
FIG. 12A
FIG. 12B
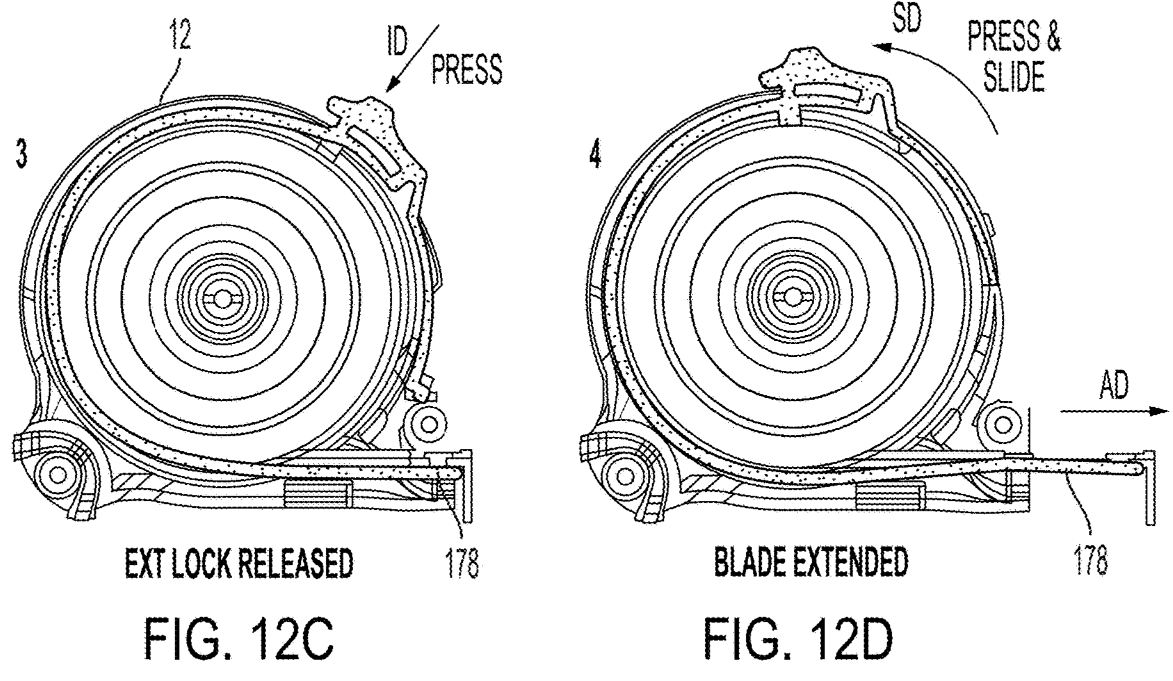
FIG. 12C
FIG. 12D

TAPE MEASURE WITH POP OUT BLADE PRESENTATION

FIELD

The present patent application relates to tape measures.

BACKGROUND

A tape measure or tape rule assembly is a measuring device. The tape measure generally includes an elongated rule blade that is mounted on a reel rotatably disposed within a housing. The blade may be a flexible tape or a retractable tape. The blade may be resiliently coiled within the housing. That is, the blade may be spring biased into the housing. The blade is normally printed with incremental measuring marks/indicia for measuring distances. The blade is retracted into the housing for storage by coiling the blade about the reel. A front of the blade generally includes a hook or an end hook that provides a surface to engage and fix the end of the blade against a point to be measured from, so the measurement can be made from the hook to a position on the blade indicated by the measuring indicia. The housing may often have a lock mechanism that allows the blade to be locked into a certain position relative to the housing (e.g., locked into an extended position, preventing the spring bias from retracting the blade into the housing). The housing may also often have a belt clip located thereon that allows users to clip the tape measure onto their belt. Further, in the tape measure assembly, the blade is typically fixed to a motor assembly that includes the spring therein and is tensioned against a fixed hub. Traditional springs are attached to reels or cases in tape measure via physical interlocks, cut into one or more of the spring and an attaching surface, or are assembled with physical retainers such as rivets, screws, or bolts.

To measure a workpiece, a length of the blade is pulled out of the housing to span the distance to be measured and the blade or hook is held against the workpiece so that gradation lines and numbers printed on the blade can be read against a point on the workpiece. To measure a distance between two objects or surfaces, the hook at the free end of the blade may be temporarily secured or placed against an object or surface. Distances can then be marked with a marking tool, such as a pencil, directly onto the surface measured.

The present patent application provides improvements in the tape measures or retractable rule assemblies.

SUMMARY

The present patent application provides a retractable rule assembly.

One aspect of the present patent application provides a retractable rule assembly. The retractable rule assembly comprises a housing, a reel, an elongated blade, a hook, a coil spring, and a blade advancer. The reel is rotatably mounted in the housing. The elongated blade is wound on the reel and is constructed and arranged to extend outwardly through an opening in the housing. The hook is positioned on a distal end of the blade. The coil spring is configured to rotate the reel in the housing assembly in a direction to wind up the elongated blade when extending outwardly of the housing. The blade advancer is constructed and arranged to be manually engaged and moved relative to the housing and into contact with the blade and/or the reel. The blade advancer is movable against a bias of the coil spring to advance the blade in a direction that extends the blade outwardly from the housing.

Implementations of the foregoing aspects may include one or more of the following features.

In an aspect, the blade advancer may comprise a manually engageable roller.

In an aspect, the retractable rule assembly may further comprise a spring that biases the roller away from the blade and/or reel. The roller may be configured to be manually forced against the bias of the spring and into engagement with the blade and/or reel and manually rolled to move the blade in the direction that extends the blade outwardly from the housing.

In an aspect, the roller may be disposed above the blade and is normally held away from the blade due to the bias of the spring In an aspect, the roller may be disposed below the blade and is normally held away from the blade under the force of gravity.

In an aspect, the blade advancer may form part of a releasable blade lock assembly. The blade lock assembly may be constructed and arranged to be manually actuated to lock the blade in any position of extension outwardly of the housing opening and to release the blade from any position in which it is locked.

In an aspect, the blade lock assembly may be movable in a first direction to lock the blade and a second direction, opposite direction, to advance the blade.

In an aspect, the blade advancer may include a first engaging portion disposed on the blade lock assembly and a second engaging portion disposed on the reel. The first engaging portion of the blade lock assembly may be configured to interlock with the second engaging portion of the reel to facilitate advancement of the blade in the direction that extends the blade outwardly from the housing. The first engaging portion may include a projection and the second engaging portion may include teeth that are configured to engage and interlock with the projection.

In an aspect, the blade advancer, which forms part of releasable blade lock assembly, may include a cam surface. The cam surface may be configured to force a friction pad feature against the blade/reel to facilitate advancement of the blade in the direction that extends the blade outwardly from the housing.

In an aspect, the blade advancer, which forms part of releasable blade lock assembly, may include an end hook pusher. The end hook pusher may be configured to engage with the hook positioned on the distal end of the blade to push the hook and the blade connected thereto outwardly from the housing.

In an aspect, the blade advancer may include a manually engageable portion disposed on the housing and moveable along a slot disposed on the housing, a drive gear operatively connected to the manually engageable portion, and a driven gear operatively connected to the reel. The manually engageable portion may include a rest configuration and an operational configuration. When the manually engageable portion is in its rest configuration, there may be no engagement between the drive gear and the driver gear. When the manually engageable portion is in its operational configuration, the drive gear and the driver gear may be configured to engage with each other so as to rotate the reel.

In an aspect, when a force is applied on the manually engageable portion, the manually engageable portion may be moved along the slot from its rest configuration to its operational position. When the manually engageable portion is in its operational configuration, the drive gear and the driver gear may be configured to engage with each other to facilitate the rotation of the reel and the advancement of the blade in the direction that extends the blade outwardly from the housing.

In an aspect, the manually engageable portion may include a spring-biased manually engageable lever.

Another aspect of the present patent application provides a retractable rule assembly comprises a housing, a reel, an elongated blade, a coil spring, and a spring biased blade advancer. The reel is rotatably mounted in the housing. The elongated blade is wound on the reel and is constructed and arranged to extend outwardly through an opening in the housing. The coil spring is configured to rotate the reel in the housing assembly in a direction to wind up the elongated blade when extending outwardly of said housing. The spring biased blade advancer comprises a pusher and a spring, the blade advancer being constructed and arranged such that when actuated, the spring pushes the pusher to engage a portion of the blade or the reel against a bias of the coil spring to advance the blade in a direction that extends the blade outwardly from the housing.

Implementations of the foregoing aspects may include one or more of the following features.

In an aspect, the blade may comprise a hook. The pusher, when moved by the spring, may contact the hook to extend the blade outwardly from the housing.

In an aspect, a spring force of the blade advancer spring may be sufficiently large to overcome the spring force of the coil spring retracting the blade into the housing.

In an aspect, the blade advancer may remain extended until manually forced to a retracted position.

In an aspect, the blade advancer may serve as a shock absorber against rapid retraction of the blade while in the extended position.

In an aspect, the blade advancer may serve as additional finger support while in the extended position.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. In addition, as used in the specification and the claims, the term "or" means "and/or" unless the context clearly dictates otherwise. It should also be appreciated that some of the components and features discussed herein may be discussed in connection with only one (singular) of such components, and that additional like components which may be disclosed herein may not be discussed in detail for the sake of reducing redundancy.

Other aspects, features, and advantages of the present patent application will become apparent from the following detailed description, the accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which

FIGS. 10A-10D show various views of the retractable rule assembly according to an embodiment of the present patent application, wherein the blade advancer may form part of releasable blade lock assembly, wherein the releasable blade lock assembly is shown in a locked configuration in FIG. 10A and an unlocked configuration in FIG. 10B, and wherein the blade advancer is shown in a spool engaged configuration in FIG. 10C and in a blade extended configuration in FIG. 10D in which the blade is advanced in a direction that extends the blade outwardly from the housing;

FIGS. 11A-11D show various views of the retractable rule assembly according to another embodiment of the present patent application, wherein the blade advancer may form part of releasable blade lock assembly, wherein the releasable blade lock assembly is shown in a locked configuration in FIG. 11A and an unlocked configuration in FIG. 11B, and wherein the blade advancer is shown in a friction pad engaged configuration in FIG. 11C and in a blade extended configuration in FIG. 11D in which the blade is advanced in the direction that extends the blade outwardly from the housing;

FIGS. 12A-12D show various views of the retractable rule assembly according to yet another embodiment of the present patent application, wherein the blade advancer may form part of releasable blade lock assembly, wherein the releasable blade lock assembly is shown in a locked configuration in FIG. 12A and an unlocked configuration in FIG. 12B, and wherein the blade advancer is shown in an extension lock disengaged or released (prior to being pressed) and engaged (when pressed) configuration in FIG. 12C and in a blade extended configuration in FIG. 12D in which the blade is advanced in the direction that extends the blade outwardly from the housing;

DETAILED DESCRIPTION

Figure 1A:
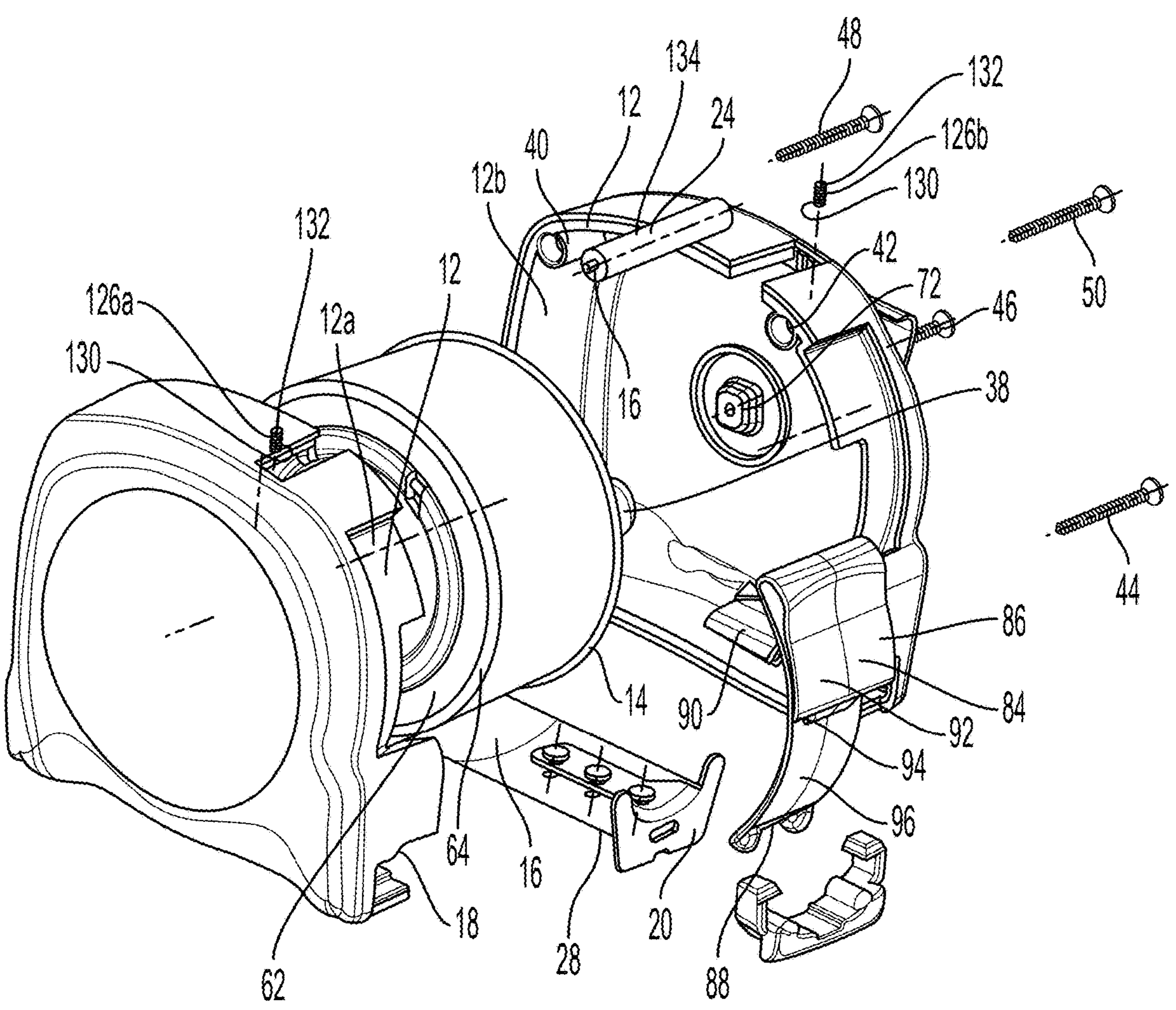
FIGS. 1A and 1B show a partial exploded perspective view and a fully exploded view of a retractable rule assembly according to an embodiment of the present patent application, wherein a top manually engageable roller acting as a blade advancer is shown.
Figure 1B:
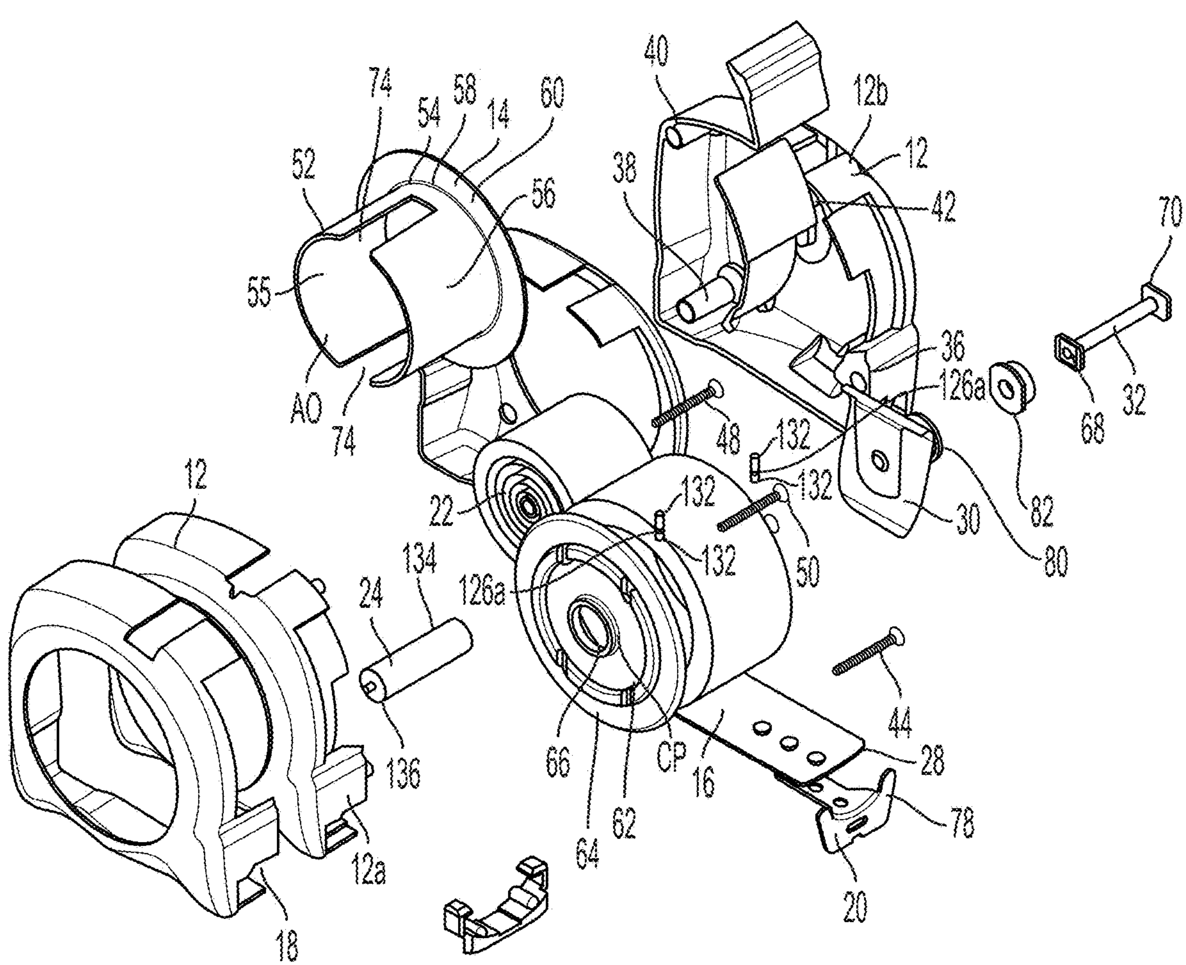
Figure 1C:
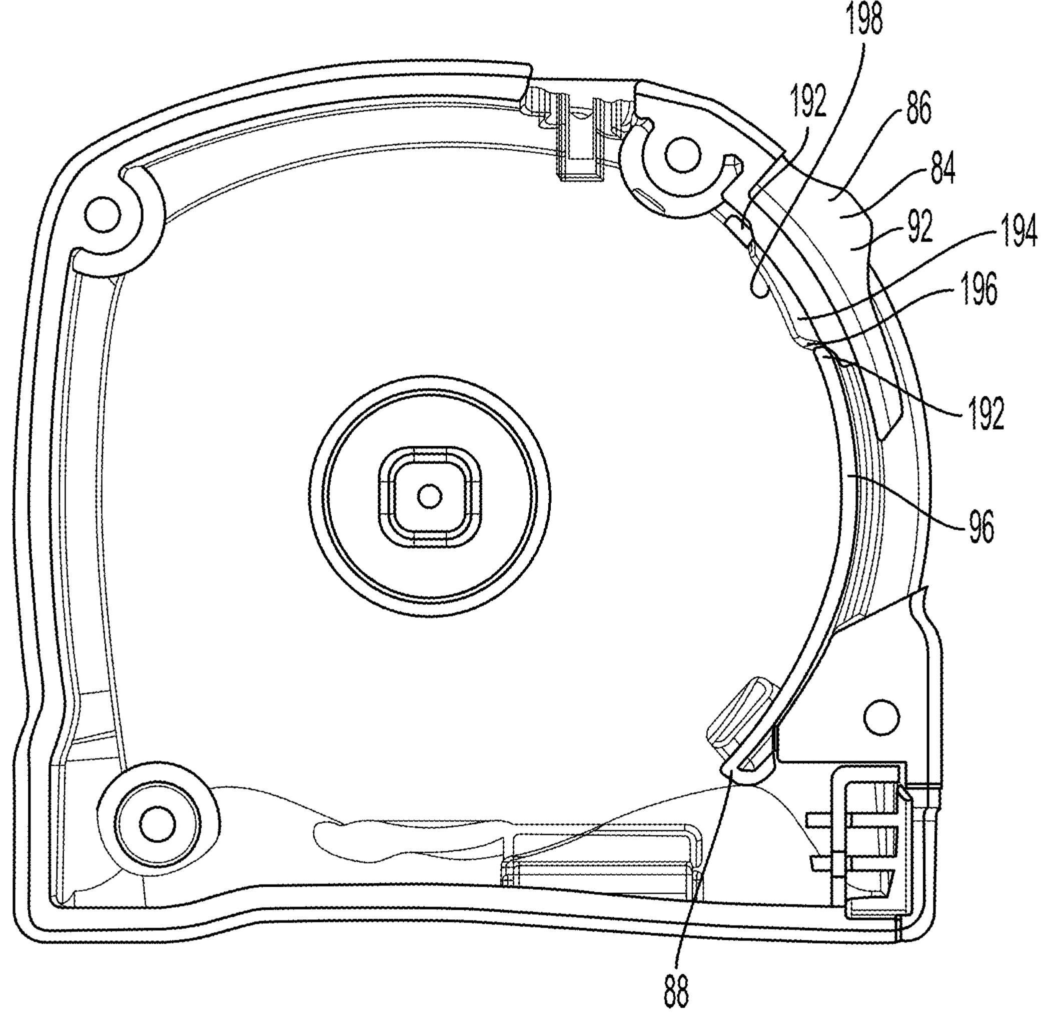
FIG. 1C shows a cross-sectional view of the retractable rule assembly, wherein only one housing member and a releasable blade lock assembly are being shown (and other components of the retractable rule assembly are not shown for sake of clarity and to better illustrate the housing member and the releasable blade lock assembly)
Figure 2:
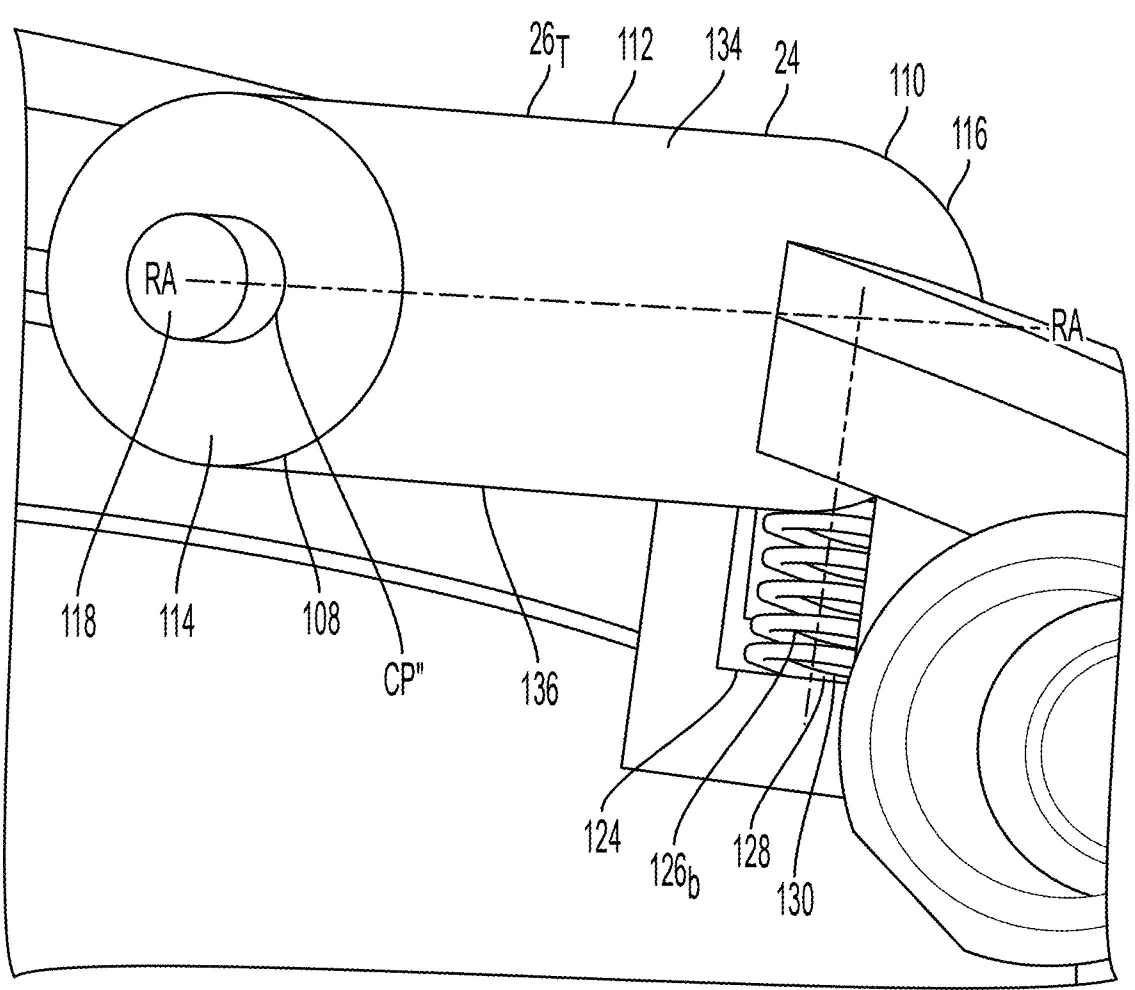
FIG. 2 shows a partial (top portion) perspective view of a housing portion of the retractable rule assembly according to an embodiment of the present patent application, wherein the top manually engageable roller acting as the blade advancer and a spring that biases the roller away from a blade and/or a reel are disposed in the housing portion.
Figure 3:
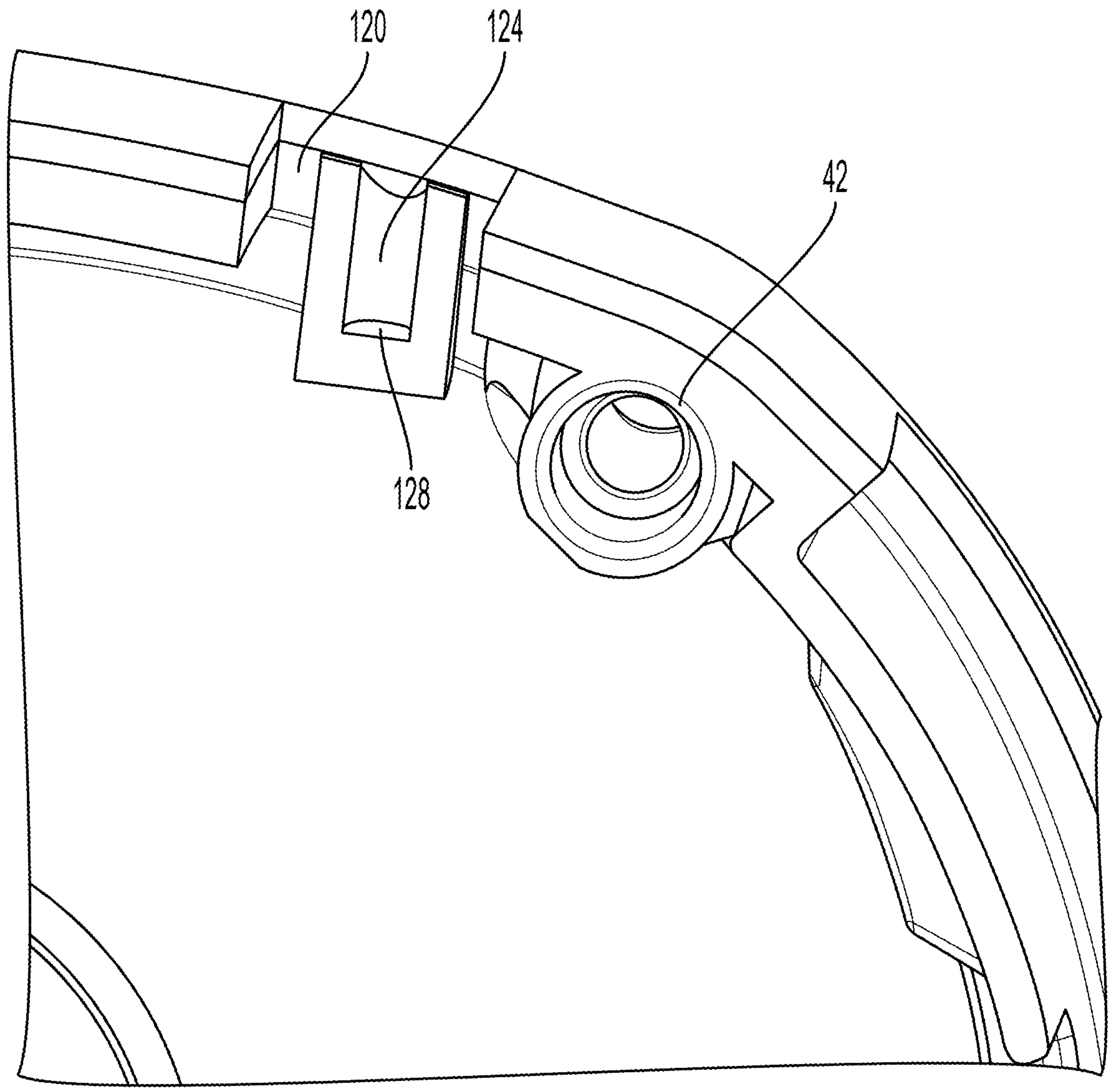
FIGS. 3 and 4 show a partial (top portion) perspective view and a partial top view of the housing portion of the retractable rule assembly according to an embodiment of the present patent application, wherein the top manually engageable roller acting as the blade advancer and the spring that biases the roller away from the blade and/or a reel are not shown so that a spring receiving opening configured to receive the spring and a roller receiving portion configured to receive a portion of the roller are clearly shown.
Figure 4:
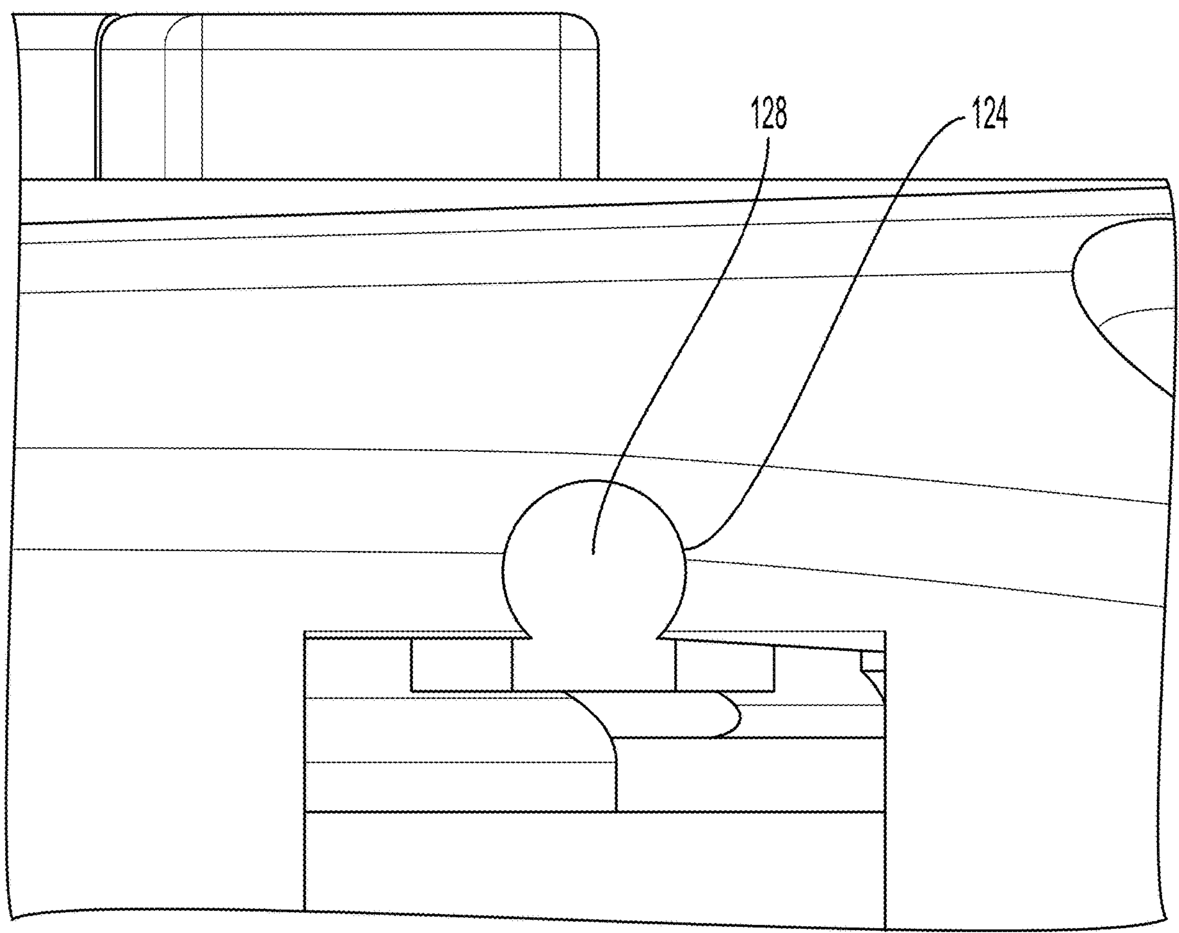

The present patent application provides a retractable rule assembly 10 as shown in FIGS. 1A-1C. The rule assembly 10 includes a housing 12, a reel 14, an elongated blade 16, a hook (or end hook) 20, a coil spring 22, and a blade advancer 24. The reel 14 may be rotatably mounted in the housing 12. The elongated blade 16 may be wound on the reel 14 and may be constructed and arranged to extend outwardly through an opening 18 in the housing 12. The hook 20 may be positioned on a distal end 28 of the blade 16. The coil spring 22 may be configured to rotate the reel 14 in the housing 12 in a direction to wind up the elongated blade 16 when extending outwardly of the housing 12. The blade advancer 24 may be constructed and arranged to be manually engaged and moved relative to the housing 12 and into contact with the blade 16 and/or the reel 14. The blade advancer 24 may be movable against a bias of the coil spring 22 to advance the blade 16 in a direction that extends the blade 16 outwardly from the housing 12.

Figure 13:
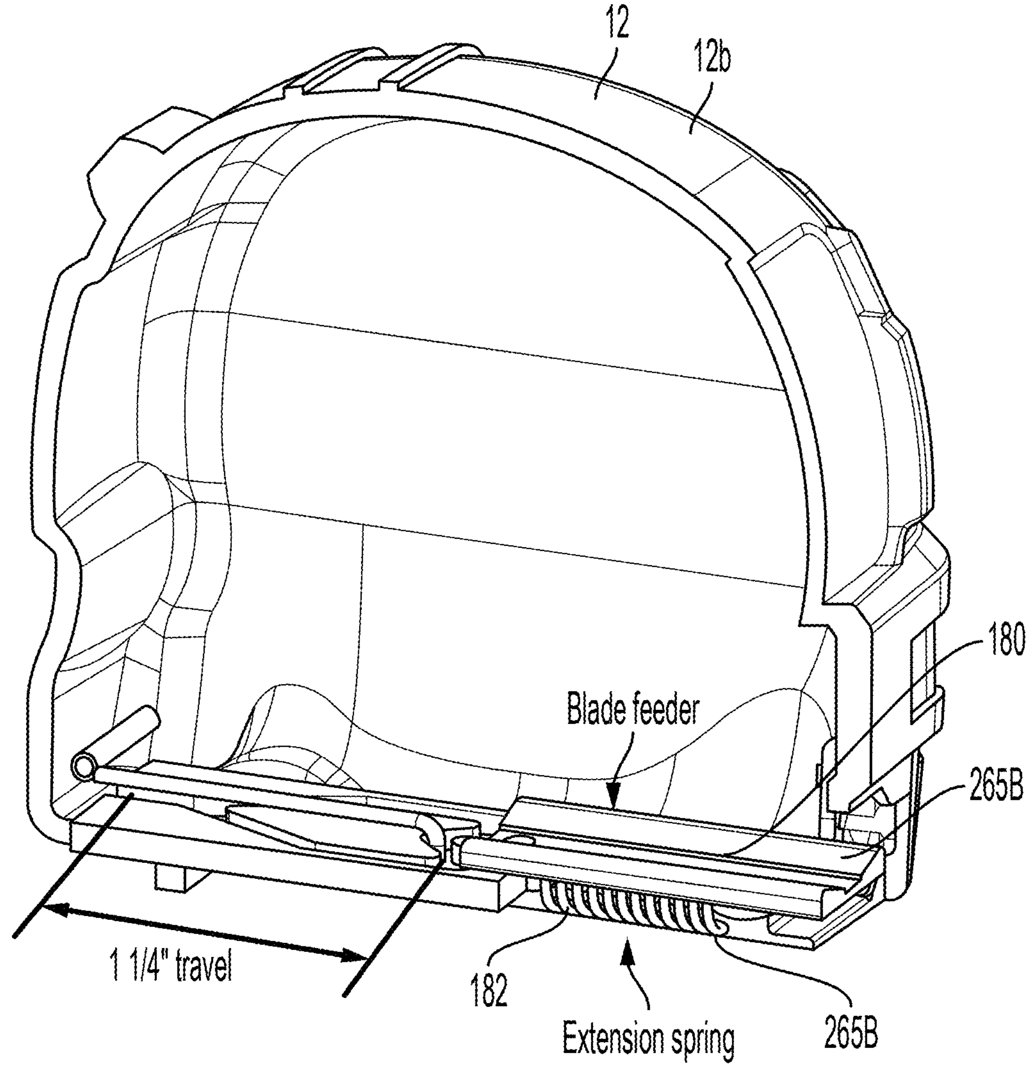
FIG. 13 shows a perspective view of a housing portion of the retractable rule assembly according to an embodiment of the present patent application, wherein the blade advancer may have a micro-SD card spring action configuration to extend the blade, wherein a blade feeder and an extension spring of the blade advancer are shown in FIG. 13.
Figure 14:
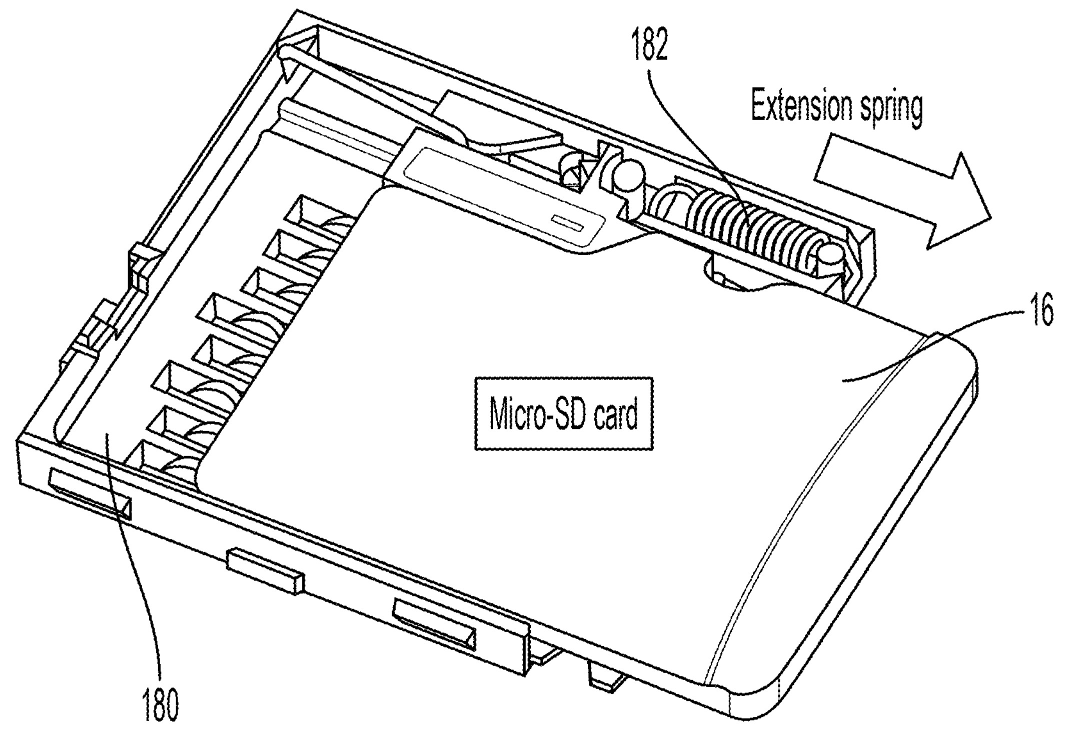
FIGS. 14 and 15 show the micro-SD card spring action configuration that may be used by the blade advancer, according to an embodiment of the present patent application, to advance the blade in the direction that extends the blade outwardly from the housing.
Figure 15:
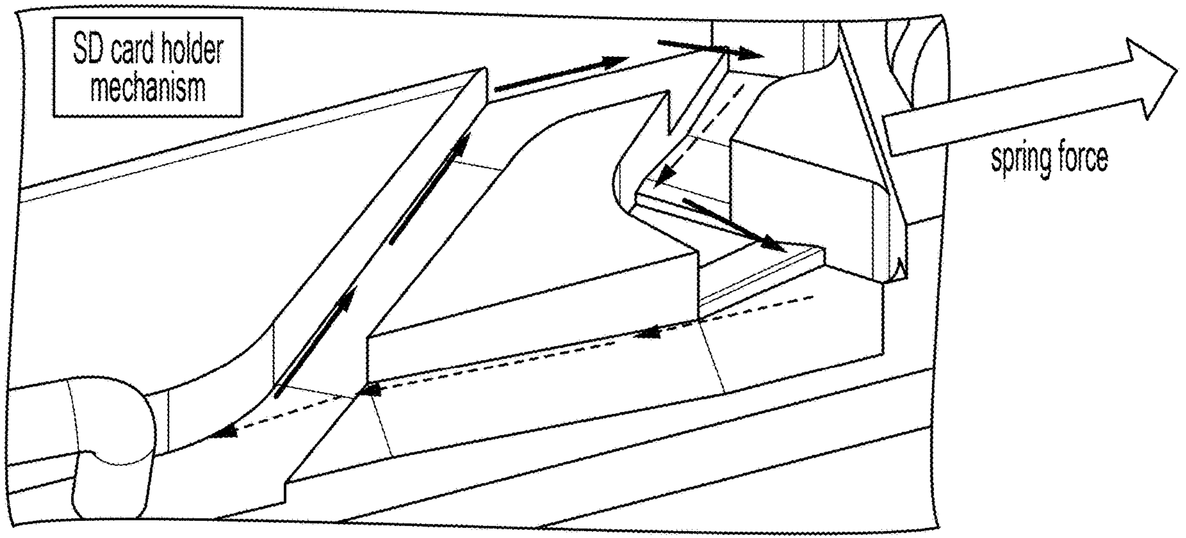

The retractable rule assembly 10 may interchangeably referred to as tape measure or tape rule case/assembly. The present patent application provides the blade advancer 24 for presenting the tape blade 16 out of (and away from) the housing 12 so a user can more easily grab the end hook 20 and start extending the blade 16 away from the housing 12. For example, the blade advancer 24 of the present patent application may include or be in the form of a blade roller (including a top manually engageable roller as shown in and described in detail below with respect to FIGS. 1A-4 and/or a bottom manually engageable roller as shown in and described in detail below with respect to FIGS. 5-9), a dual action slidelock (having three different configurations as shown in and described in detail below with respect to FIGS. 10A-12D), or may have a microSD (i.e., a type of removable flash memory card used for storing information) type spring action configuration (as shown in and described in detail below with respect to FIGS. 13-15). The blade advancer 24 of the present patent application may have the automatic extension configuration as shown in and described with respect to FIGS. 16-17.

The housing 12 may be constructed to easily and comfortably fit in a hand of the user because it optimizes the use of space within the housing 12 to house the blade 16, the reel 14, the coil spring 22 including a spindle/shaft 32, and other components of the retractable rule assembly 10. The housing 12 may be constructed of, for example, a molded plastic material.

The housing 12 may include a pair of cooperating housing members 12*a*, 12*b* (e.g., a first housing member 12*a* and a second housing member 12*b*). The housing members 12*a*, 12*b* may include portions along abutting free edges thereof. The portions may help secure the molded housing members 12*a*, 12*b* of the assembled rule assembly 10 together. The second housing member 12*b* and the first housing member 12*a* may be movable toward one another in an axial direction into cooperating relation to define the housing 12. The "axial direction" may refer to the direction of the axis of rotation of the reel 14 defined by the shaft 32.

Each housing member 12*a*, 12*b* may include four corner portions 36, 38, 40, 42. For example, the first corner portion 36 may be adjacent the blade opening 18, the second corner portion 38 may be at an opposite bottom end of the housing 12, and the third and fourth corner portions 40 and 42 may be in peripheral top portions of the housing 12. Each corner portion 36, 38, 40, 42 of each housing member 12*a*, 12*b* may include either a recess or a projection and an opening in the respective recess/projection. At each corner portion 36, 38, 40, 42, the recess/projection of one of the housing members 12*a*, 12*b* may be configured to receive or engage with the projection/recess of the other of the housing member 12*a*, 12*b*. Also, the opening in the recess/projection of one of the housing members 12*a*, 12*b* may be configured to align with the opening in the projection/recess of the other of the housing members 12*a*, 12*b*. Fasteners 44, 46, 48, 50 may then be positioned in aligned openings of the corner portions 36, 38, 40, 42 of the housing member 12*a*, 12*b*. Thus, it can be appreciated that the housing members 12*a*, 12*b* may be secured together using fasteners in these locations.

Figure 5:
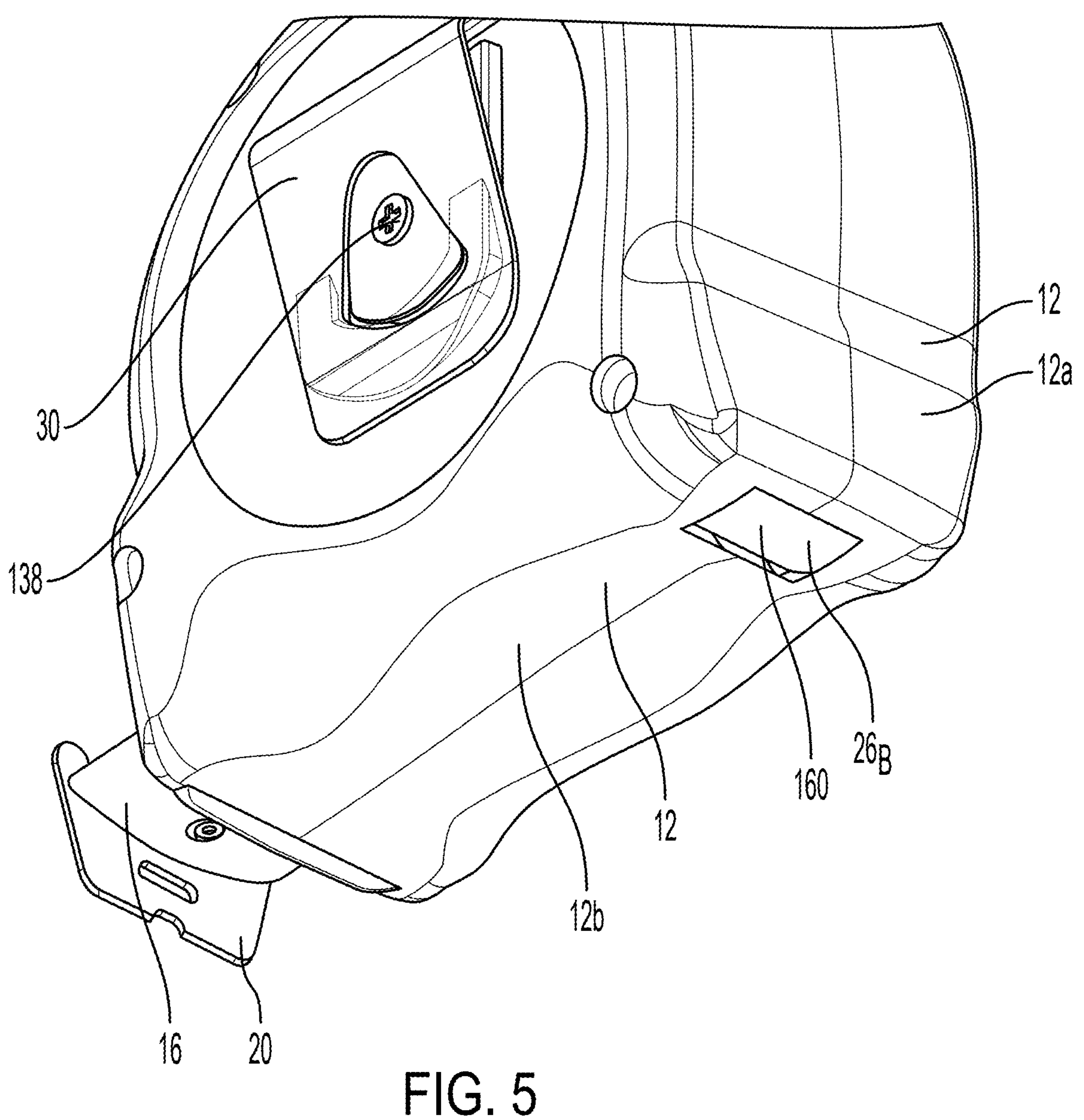
FIG. 5 shows a partial perspective view of the retractable rule assembly according to an embodiment of the present patent application, wherein a bottom manually engageable roller acting as the blade advancer is shown.
Figure 6:
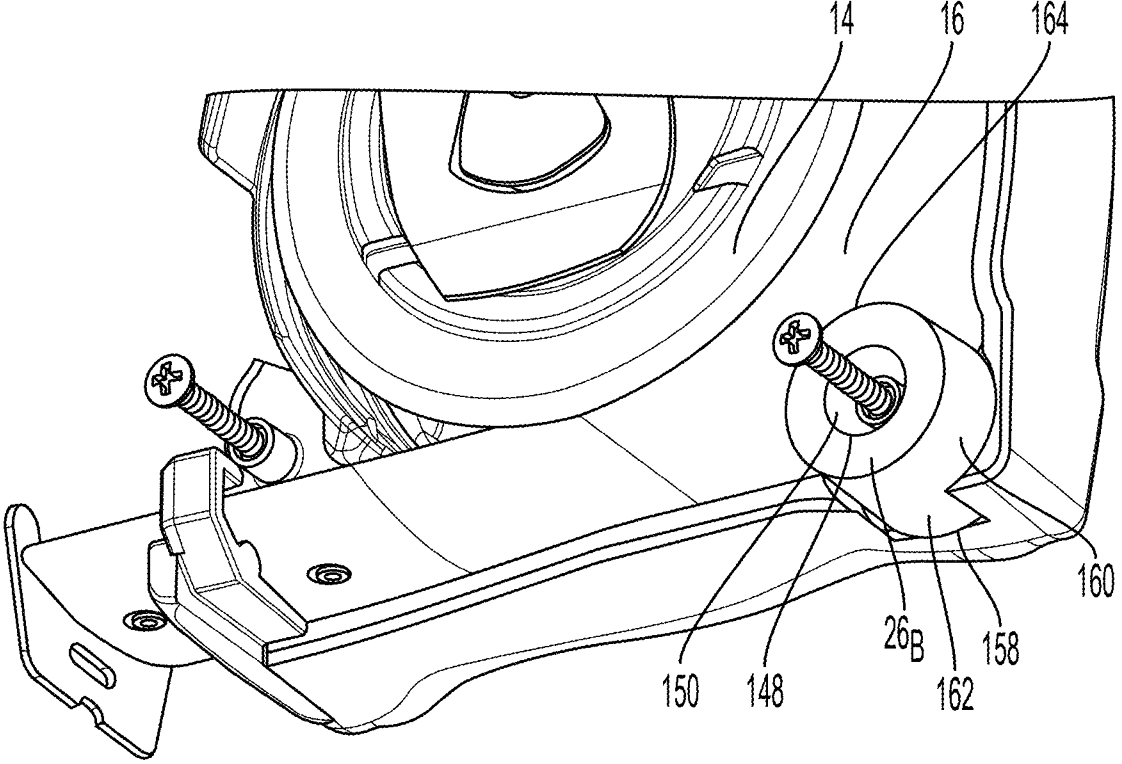
FIG. 6 shows a partial (bottom portion) perspective view of the housing portion of the retractable rule assembly according to an embodiment of the present patent application, wherein the bottom manually engageable roller acting as the blade advancer is shown as being disposed in the housing portion.
Figure 7:
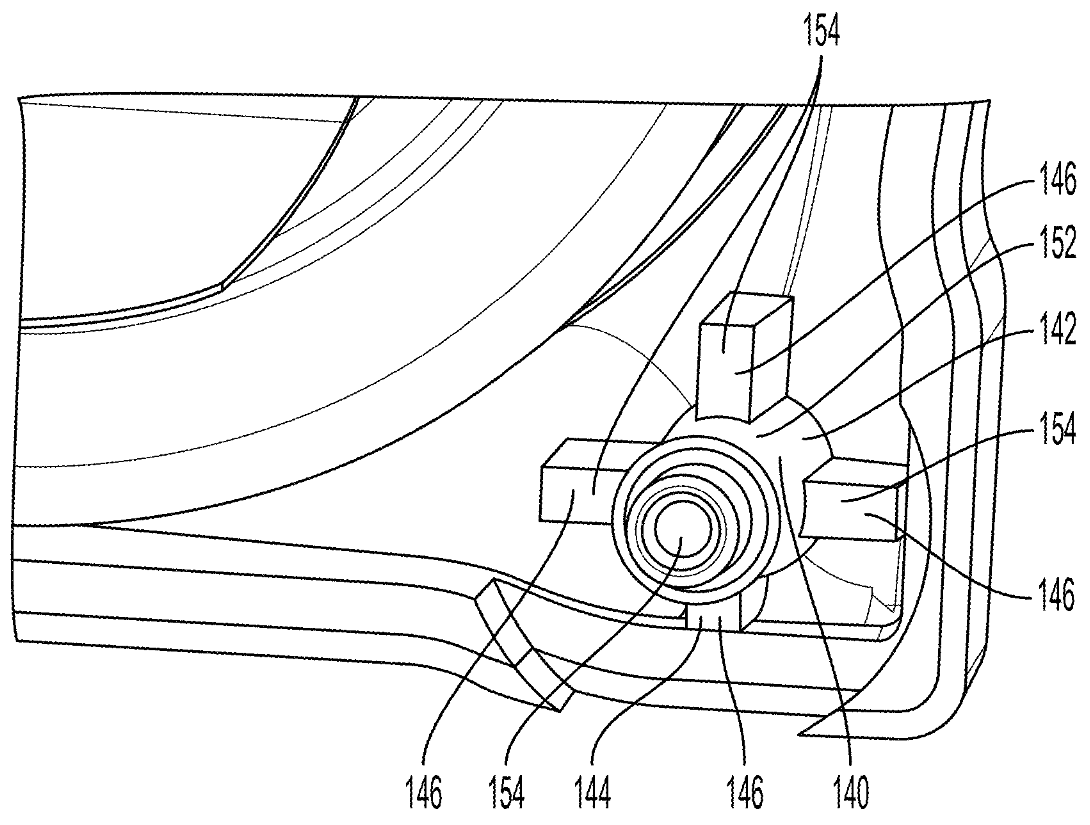
FIG. 7 shows another partial (bottom portion) perspective view of the housing portion of the retractable rule assembly according to an embodiment of the present patent application, wherein the bottom manually engageable roller acting as the blade advancer is not shown so that a roller supporting portion configured to support a portion of the roller thereon is clearly shown, wherein portions of the reel mounted in the housing portion are also shown in FIG. 7.

A belt clip 30 may be secured to one side of the housing 12 by a fastener 138 (as shown in FIG. 5). The belt clip 30 may be generally used to attach the rule assembly 10 to the belt of a user, or other attachment point. The belt clip 30 may be made from, for example, a metal material.

The reel 14 may be interchangeably referred to as spool or blade reel. The reel 14 may have a first end portion 52 and an opposing second end portion 54. The reel 14 may include a cylindrical/peripheral side wall 56 extending between the first end portion 52 and the second end portion 54. The second end portion 54 of the reel 14 may include a second wall 58 extending perpendicular to the cylindrical side wall 56. The second wall 58 may form base/bottom wall of the reel 14. The second wall 58 may also extend perpendicular to and outwardly away from the cylindrical side wall 56 to form a flange portion 60. The second wall 58 and the cylindrical side wall 56 of the reel 14 may together define a storage space SS and an access opening AO to the storage space SS. A first wall 62 may be detachably/removably connected to the circumferential side wall 56 at the first end 52. The first wall 62 may be configured to cover the storage space SS and the access opening AO. The first wall 62 may form top wall/lid/cover of the reel 14. The first wall 62 may also extend perpendicular to and outwardly away from the cylindrical side wall 56 to form a flange portion 64. As will be clear from the discussions below, the coil spring 22 and at least a portion of the shaft 32 are received in the storage space SS. The reel 14, including the first wall 62, the second wall 58 and the cylindrical side wall 56, may have a cylindrical shaped configuration.

The first wall 62 may include an opening 66. The opening 66 of the first wall 62 may be disposed centrally (i.e., in a central portion CP) in the first wall 62. The opening 66 of the first wall 62 may be configured to allow a first end portion 68 of the shaft 32 to pass therethrough such that the first end portion 68 of the shaft 32 may be fixedly connected to a portion (not shown but may be disposed centrally (i.e., in a central portion) on the housing member 12*a*) of the housing 12.

Similarly, the second wall 58 may include an opening (not shown). The opening of the second wall 58 may be disposed centrally (i.e., in a central portion) in the second wall 58. The opening of the second wall 58 may be configured to allow a second end portion 70 of the shaft 32 to pass therethrough such that the second end portion 70 of the shaft 32 may be fixedly connected to a portion 72 (disposed centrally (i.e., in a central portion) on the housing member 12*b*) of the housing 12.

The reel 14 may be made of a molded plastic and may be provided with a slot or an opening 74 in the cylindrical side wall 56 thereof. A first longitudinal end (not shown but may be opposite to the second longitudinal free end/distal end 28) of the blade 16 may terminate in a hook-like structure that engages a second longitudinal end of the coil spring 22 (disposed in the storage space SS of the reel 14) so as to connect the first longitudinal end of the blade 16 to the second longitudinal end of the coil spring 22. The coil spring 22 may have the second opposing longitudinal end and an opposing first longitudinal end. The second longitudinal free end (or the distal end) 28 of the blade 16 may extend generally outwardly of the reel 14.

The reel 14 may have an outer wall containing the blade 16. The reel 14 may be configured to enclose the blade 16 on three sides. For example, the reel 14 may have outer surfaces (e.g., of the cylindrical side wall 56, of the flange portion 64 of the first wall portion 62, and of the flange portion 60 of the second wall portion 58) that are configured to contain the blade 16.

The elongated blade or blade 16 may be formed of a ribbon of metal (e.g., the metal being steel), and a top concave surface of the blade 16 may be printed with measuring lines and digits (not shown) for measuring lengths and distances. The blade 16 may include the first longitudinal end (that may be secured to the coil spring 22 via the slot/opening 74) and the opposing, second longitudinal free end 28 of the blade 16 may extend generally outwardly of the housing 12. The blade 16 may be constructed and arranged with respect to the housing 12 to extend generally from a position tangential of the reel 14 outwardly through the blade opening 18 provided in the housing 12.

The blade 16 may be generally movable between a fully retracted position to a fully extended position. It can be appreciated that as the blade 16 is unwound from the reel 14, the coil spring 22 may be wound around the rigidly fixed shaft 32. This winding of the coil spring 22 around the shaft 32 stores energy in the coil spring 22 to provide spring powered rewinding of the blade 16 around the reel 14 when the extended blade 16 is released.

The blade 16 may be constructed of a ribbon of sheet metal that is shaped during the manufacturing to have a normal or memory configuration that has a generally arcuate or concavo-convex transverse cross-section. When a portion of the blade 16 is wound about the reel 14, the wound portion has a flat transverse cross-section and the wound layers of the coiled blade provide the wound blade with an abutting volute coil configuration. In other words, when the blade 16 is wound around the reel 14, it has the flat cross-section and when the blade 16 is withdrawn from the housing 12 to measure an object, it returns to the concavo-convex cross-section. Thus, the coil spring 22 is constructed and arranged to rotate the reel 14 about the shaft 32 with respect to the housing 12 in a direction to wind up the elongated blade 16 when extending outwardly of the blade opening 18 in a normal concavo-convex cross-sectional configuration onto the reel 14 in an abutting volute coil formation in a flattened cross-sectional configuration. The concavo-convex cross-section provides the extended blade with rigidity and maintains the blade essentially straight in the longitudinal direction. The concavo-convex cross-section of the blade 16 generally provides the unsupported blade 16 with blade standout. The concavo-convex cross-section of the blade 16 generally includes an arcuate central section and integral end sections. In various embodiments, the concavo-convex cross-sectional configuration of the blade 16 can be of the type described in commonly assigned U.S. Pat. No. 6,324,769, which is hereby incorporated by reference in its entirety.

The blade 16 may have the end hook 20 on the free/distal end 28 thereof. The end hook 20 may include a mounting portion 76 and a hook portion 78 bent at a generally right angle from an end of the mounting portion 76. In one embodiment, the end hook 20 is formed of, for example, a sheet metal material of a predetermined thickness. The hook portion 78 may have a generally U-shaped configuration. The mounting portion 76 may have a generally concavo-convex configuration. The mounting portion 76 may have a generally flat configuration. The end hook 20 may be mounted on the free end 28 of the blade 16 with the mounting portion 76 thereof secured in engagement with a concave (upper) side of the free end 28 of the blade 16 and in overlying relation thereto. In one embodiment, the connection between the free end 28 of the blade 16 and the mounting portion 76 may permit limiting sliding movement therebetween. For example, such a configuration of the limited sliding movement of the end hook 20 with respect to the blade 16 can be of the type described in commonly assigned U.S. Pat. No. 8,528,222, which is hereby incorporated by reference in its entirety.

The coil spring 22 may be constructed and arranged to be received and stored within (the storage space SS of) the reel 14. The coil spring 22 may be constructed and arranged to rotate the reel 14 with respect to the housing 12 in a direction to wind the elongated blade 16 about the reel 14 when the blade 16 is extending outwardly of the blade opening 18.

The coil spring 22 may include the first longitudinal end and the opposing second longitudinal end. The first longitudinal end of the coil spring 22 may be secured to the shaft 32 via a slot (not shown) in the shaft 32, and the second longitudinal end of the coil spring 22 may be secured to the blade 16 via slot 74 in the reel 14. The coil spring 22 may be a thin, flat ribbon of metal (e.g., the metal being steel).

The shaft 32 may be constructed of, for example, a molded plastic material or a nylon material. The shaft 32 may be axially extending and may be fixed at a central portion of the housing 12. Connection portions 80, 82 may be disposed at ends 68, 70 of the shaft 32. The connection portions 80, 82 may be configured to interengage with noncircular connection portions 72 of the housing 12 (e.g., in a central region of the housing 12).

In the illustrated embodiment, the connection portions 80, 82 may include noncircular recesses that may be configured to receive and engage with the noncircular projections 72 of the housing 12. In another embodiment, the connection portions 80, 82 may include noncircular projections that may be configured to receive and engage with the noncircular recesses of the housing 12. The construction of the recesses may be identical, and the construction of the protections may be identical. The projections may have exterior noncircular cross-sections and may be configured to be received within recesses having complementary noncircular interior cross-sections. The noncircular interior and exterior cross-sections cooperate to prevent rotation of the shaft 32 with respect to the housing 12 when the ends of the shaft 32 are mounted interengageably connected with portion of the housing 12 in the assembled rule assembly 10.

The end 70 of the shaft 32 may be interiorly threaded to threadedly receive the fastener 138 (as shown in FIG. 5) therein. The fastener 138 may extend through a central hole formed in the second housing member **12*b* and may be configured to threadedly engage internal threading in the end 70 of the shaft 32. The fastener 138 may extend through the connection portion 82 and through the connection portion 72 of the second housing portion 12*b*, when the fastener 138 is disposed in the central hole of the second housing member 12*b* and the threaded interior end of the shaft 32. The interengaging connection between the end 70 of the shaft 32 and the first housing member 12*b* may be configured to provide a fixed configuration of the shaft 32 at the end 70 of the shaft 32**.

Similarly, the end 68 of the shaft 32 may be configured to receive a fastener (not shown) therein. The fastener may extend through a central hole formed in the first housing member **12*a* and may be configured to be received in the end 68 of the shaft 32. The fastener may extend through the connection portion 80 and through the connection portion 72 in the first housing member 12*a* when the fastener is disposed in the central hole of the first housing member 12*a* and the end 68 of the shaft 32. The fastener through the end 68 of the shaft 35 and the first housing member 12*a* may be optional. The interengaging connection between the end 68 of the shaft 32 and the first housing member 12*a* may be configured to provide a fixed configuration of the shaft 32 at the end 68 of the shaft 32**.

The retractable rule assembly 10 may also include a releasable blade lock assembly 84 that is constructed and arranged to be manually actuated to hold the blade 16 in any position of extension outwardly of the housing/blade opening 18 and to release the blade 16 from any position in which it is held. In various embodiments, the releasable blade lock assembly or holding assembly can be of the type described in commonly assigned U.S. Pat. No. 8,117,763, which is hereby incorporated by reference in its entirety.

Referring to FIGS. 1A-1C and 10, the releasable blade lock assembly 84 may include a lock member 86 mounted on the housing 12 for movement in opposite directions between a normally inoperative/release position and a holding/lock position. The lock member 86 may interchangeably referred to as holding member. It can be appreciated that the lock member 86 may have an arcuate member that is movable along an arcuate path between the two positions (i.e., normally inoperative/release position and a holding/lock position). The lock member 86 may have an interior free end portion 88 that is movable into wedging engagement with the tangentially extending portion of the blade 16 to engage and hold/lock the blade 16 against an interior holding structure 90 on the housing 12 when the lock member 86 is in its lock/holding position. The lock member 86 may have an exterior thumb engaging portion 92 configured to be moved digitally to selectively move the lock member 86 from its normally inoperative/release position and its holding/lock position.

The lock member 86 is an integral structure made of, for example, an appropriate durable flexible plastic material. The thumb engaging portion 92 is connected by an integral outwardly extending neck portion 94 to an elongated arcuate flexible body portion 96 that terminates in the interior free end 88. The outwardly extending portion 94 is slidably held within and guided by a slot formed within a front part of housing 12. The movement of a lower portion of the lock member 86 may be guided by a pair of tabs integrally formed on respective housing members **12*a*, 12*b*. An integral lock/locking structure 192 of the lock member 86 may be configured to engage a holding structure 194 integrally formed on the housing 12 to releasably lock the lock member 86 in the holding/lock position in wedging engagement with the blade 16**.

In one embodiment, to lock the blade 16 in a given position of extension, the user (while holding the blade 16 outwardly of the housing 12 against the spring force of the coil spring 22) slides the thumb engaging portion 92 downwardly with respective to the housing 12 causing the lock structure 192 of the lock member 86 to slide over a ramped surface 198 on the holding structure 194 of the housing 12 and causing the free end 88 of the lock member 86 to move in a locking direction with respect to the blade 16. The flexible plastic lock structure 192 of the lock member 86 bends resiliently outwardly slightly as it passes over the holding structure 194 of the housing 12. After the free end 88 contacts the blade 16, continued movement of the thumb engaging portion 92 in the locking (downward) direction thereafter wedges the free end 88 of the flexible body portion 96 against blade 16 to hold the blade 16 in place against the spring force of the coil spring 22 and moves the lock structure 192 of the lock member 86 into abutting engagement with a locking surface 196 on the holding structure 194. The lock member 86 may flex slightly as the free end 88 is wedged against the blade 16. The abutting engagement between the lock structure 192 of the lock member 86 and the locking surface 196 of the housing 12 locks the lock member 86 in its holding/lock position. It can be understood that the blade 16 is held in an extended position (against the spring force of the coil spring 22) between the free end 88 of the body portion 96 and the interior holding structure 90 by the downward force exerted by the wedged body portion 96. The interior holding structure 90 may include a series of longitudinally spaced, transversely extending ribs that are constructed and arranged to support the convex side of the blade 16.

To release the blade 16, the user pulls upwardly on the thumb engaging portion 92 which causes the locking structure 192 on the plastic lock member 86 to move resiliently outwardly and past the locking surface 196 of the housing 12 to release the lock member 86 from engagement with the blade 16. The lock member 86 resiliently returns to its normal arcuate shape.

When taking a measurement, the user typically holds the housing 12 in one hand and manually pulls the blade 16 out of the housing 12 with the other hand. When a sufficient length of blade 16 has been withdrawn from the housing 12, the user can lock the blade 16 with respect to the housing 12 using the releasable blade lock assembly 84 to prevent the blade 16 from retracting back into the housing 12 (under the spring force of the coil spring 22) when the user releases the blade 16. When the measurement has been taken, the user simply releases the releasable blade lock assembly 84 from locking engagement with the blade 16. It can be understood that the use of the releasable blade lock assembly 84 when a measurement is being taken is optional. If the releasable blade lock assembly 84 is not used during the taking of a measurement, the user can simply hold the blade 16 with his other hand while the measurement is being taken or, alternatively, the end hook 20 can be placed in hooking engagement with the workpiece to hold the blade 16 outwardly of the housing 12 in a controlled and steady manner against the spring force of the coil spring 22 while the measurement is being taken. When the blade 16 is released after taking the measurement, the coil spring 22 rotates the reel 14 with respect to the housing 12 in a blade-winding direction to wind the blade 16 around the reel 14.

The blade advancer 24 may include a manually engageable roller 26 (26$_T$ or 26$_B$). The manually engageable roller 26 may include a top manually engageable roller 26$_T$ as shown in and described in detail below with respect to FIGS. 1A-4. The manually engageable roller may include a bottom manually engageable roller 26$_B$ as shown in and described in detail below with respect to FIGS. 5-9.

In one embodiment, the retractable rule assembly 10 may include only the top manually engageable roller 26$_T$ operating as the blade advancer 24. The roller 26$_T$ may be disposed above the blade 16. In another embodiment, the retractable rule assembly 10 may include only the bottom manually engageable roller 26$_B$ operating as the blade advancer 24. The roller 26$_B$ may be disposed below the blade 16. In yet another embodiment, the retractable rule assembly 10 may include the top manually engageable roller 26$_T$ and the bottom manually engageable roller 26$_B$ both operating as the blade advancer 24. In yet another embodiment, the manually engageable roller 26 may include a side manually engageable roller disposed on a side of the retractable rule assembly housing (i.e., rather than on the top or the bottom of the retractable rule assembly housing). The side manually engageable roller may have the same structure and configuration as the top manually engageable roller 26$_T$. The side manually engageable roller may be disposed on a side of the retractable rule assembly housing that is opposite to the side on which the releasable blade lock assembly 84 is disposed. The side manually engageable roller may be disposed on the same side of the retractable rule assembly housing as the releasable blade lock assembly 84 is disposed. The side manually engageable roller may form the part of the releasable blade lock assembly 84. The side manually engageable roller may be disposed on a side of the blade 16. The blade advancer 24 may include any or all of the bottom manually engageable roller 26$_B$, the top manually engageable roller 26$_T$, or the side manually engageable roller.

The top manually engageable roller 26$_T$ is shown in and is described in detail below with respect to FIGS. 1A-4. The top roller 26$_T$ may be shown to be disposed near the corner 42 of the housing 12. In another embodiment, the top roller 26$_T$ may be disposed near the corner 40 of the housing 12. In yet another embodiment, the top roller 26$_T$ may be disposed at any location along the top periphery/circumference of the housing 12. The top roller 26$_T$ may be configured to be rotated to extend blade 16 out by engaging the roller 26$_T$ with the blade 16. The top roller 26$_T$ may be referred to as a spring biased roller. The retractable rule assembly 10 may further comprise a spring 126 that biases the roller 26$_T$ away from the blade 16 and/or reel 14. The roller 26$_T$ may configured to be manually forced against the bias of the spring 106 and into engagement with the blade 16 and/or reel 14 and manually rolled to move the blade 16 in the direction that extends the blade 16 outwardly from the housing 12. The top roller 26$_T$ may be disposed above the blade 16 and is normally held away from the blade due to the bias of the spring 106.

The top roller 26$_T$ may have a first end portion 108 and an opposing second end portion 110. The top roller 26$_T$ may include a cylindrical/peripheral side wall 112 extending between the first end portion 108 and the second end portion 110. The top roller 26$_T$ may include end walls 114, 116 disposed at the first end portion 108 and the second end portion 110. The end walls 114, 116 may be perpendicular to the cylindrical side wall 112. The top roller 26$_T$ may include protrusions 118 disposed centrally (i.e., in a central portion CP") in the end walls 114, 116. The protrusions 118 may extend outwardly away from the respective end walls 114, 116. The protrusions 118 may extend in an axial direction RA-RA and may extend to be parallel to the cylindrical side wall 112. The top roller 26$_T$ may be made of one or more of a plastic, rubber, and metal material. This roller can be single or multi-material.

The first housing portion 12*a* and the second housing portion 12*b* may each include a roller receiving portion 120 that is configured to receive the top roller 26$_T$ therein such that at least a portion of the top roller 26$_T$ may be protruding slightly outwardly and away from the housing 12 and at least a portion of the top roller 26$_T$ may be disposed in the housing 12. A surface/portion 134 of the cylindrical side wall 112 of at least a portion of the top roller 26$_T$ protruding slightly outwardly and away from the housing 12 may form a manually engageable surface/portion 134 of the top roller 26$_T$. In another embodiment, the surface/portion 134 of the cylindrical side wall 112 of at least a portion of the top roller 26$_T$ may not protrude slightly outwardly and away from the housing 12 and the housing 12 may have an opening through which a user may engage the surface/portion 134 of the cylindrical side wall 112 of at least a portion of the top roller 26$_T$. That is, a user engaging the manually engageable surface/portion 134 of the top roller 26$_T$ may manually force the roller 26$_T$ against the bias of the spring 106 and into engagement with the blade 16 and/or reel 14 and manually roll the top roller 26$_T$. This action may move the blade 16 in the direction that extends the blade 16 outwardly from the housing 12. A surface/portion 136 of the cylindrical side wall 112 of at least a portion of the top roller 26$_T$ disposed in the housing 12 may form the blade and/or reel engageable surface/portion 136 of the top roller 26$_T$. The surfaces/portions 134 and 136 of the roller 26$_T$ may form opposing surfaces/portions of the top roller 26$_T$. That is, the surface/ portion 136 of the cylindrical side wall 112 of at least a portion of the top roller $\mathbf{26}_T$ disposed in the housing 12 may be forced/moved into engagement with the blade 16 and/or reel 14 to move the blade 16 in the direction AD (as shown in FIGS. 10A-12D) that extends the blade 16 outwardly from the housing 12. As the top roller $\mathbf{26}_T$ may be (manually) rolled/rotated/moved, the portions of the top roller $\mathbf{26}_T$ that form surfaces/portions 134, 136 may change. In general, the surface/portion 136 of the cylindrical side wall 112 of at least a portion of the roller $\mathbf{26}_T$ may be disposed in the housing 12, while the surface/portion 134 of the cylindrical side wall 112 of at least a portion of the roller $\mathbf{26}_T$ may be protruding slightly outwardly and away from the housing 12.

The spring 126 may be one of the two springs $\mathbf{126}_a$ and $\mathbf{126}_b$ of the retractable rule assembly 10. The first housing portion 12*a* and the second housing portion 12*b* may include spring receiving portions 124 that are configured to receive the associated springs $\mathbf{126}_a$ and $\mathbf{126}_b$ therein. Each spring receiving portion 124 may include a cylindrical shaped opening to receive the corresponding spring $\mathbf{126}_a$, $\mathbf{126}_b$ therein. Each spring $\mathbf{126}_a$, $\mathbf{126}_b$ may have a compressed state/configuration in which the roller $\mathbf{26}_T$ may configured to be manually forced against the bias of the spring 106 and into engagement with the blade 16 and/or reel 14, and an expanded state/configuration (i.e., the normal state/configuration of the spring $\mathbf{126}_a$, $\mathbf{126}_b$) in which the spring $\mathbf{126}_a$, $\mathbf{126}_b$ may be configured to bias the roller $\mathbf{26}_T$ away from the blade 16 and/or reel 14. Ends 130 of the springs $\mathbf{126}_a$, $\mathbf{126}_b$ may be disposed on a surface 128 of the spring receiving portions 124 and opposing ends 132 of the spring $\mathbf{126}_a$, $\mathbf{126}_b$ (in the normal state/configuration of the spring $\mathbf{126}_a$, $\mathbf{126}_b$) may be in contact with or engagement with the corresponding protrusions 118 of the roller $\mathbf{26}_T$ to bias the roller $\mathbf{26}_T$ away from the blade 16 and/or reel 14.

The bottom manually engageable roller $\mathbf{26}_B$ is shown in and described in detail below with respect to FIGS. 5-9. The bottom roller $\mathbf{26}_B$ may be disposed below the blade 16. The bottom roller $\mathbf{26}_B$ may normally be held away from the blade 16 and/or the reel 14 under the force of gravity. The bottom roller $\mathbf{26}_B$ may include a first position (e.g., a normal position/configuration) in which the roller $\mathbf{26}_B$ may be held away from the blade 16 and/or the reel 14 under the force of gravity and a second position in which the bottom roller $\mathbf{26}_B$ may be manually forced against the force of gravity and into engagement with the blade 16 and/or reel 14 and manually rolled to move the blade 16 in the direction that extends the blade 16 outwardly from the housing 12. The bottom roller $\mathbf{26}_B$ may be referred to as a heely tape or a gravity roller. That is, the return force (to its normal position/configuration) for the bottom roller $\mathbf{26}_B$ may be provided by the force of gravity rather than springs (as is the case with the top roller $\mathbf{26}_T$).

The corner portion 36 of the second housing portion 12*b* may be configured to include a bottom roller support portion 140. The bottom roller support portion 140 may include a protrusion 142, an opening 144 extending through the protrusion 142, and peripheral/circumferential support portions 146 extending outwardly from the protrusion 142. In the illustrated embodiment, four peripheral/circumferential support portions 146 are shown to be extending outwardly from the protrusion 142. The number of circumferential support portions 146 may vary. In another embodiment, three circumferential support portions 146 may be extending outwardly from the protrusion 142.

The bottom roller $\mathbf{26}_B$ may be configured to be rotated to extend blade 16 out by engaging the bottom roller $\mathbf{26}_B$ with the blade 16/the reel 14. The bottom roller $\mathbf{26}_B$ may include a first end portion 156, a second end portion 158, and an opening 148 therein. The opening 148 may be disposed centrally (in a central portion) of the bottom roller $\mathbf{26}_B$ and may be extending between the first end portion 156 and the second end portion 158 of the bottom roller $\mathbf{26}_B$. The bottom roller $\mathbf{26}_B$ may also include a cylindrical/peripheral side wall 160 extending between the first end portion 156 and the second end portion 158.

Figure 8:
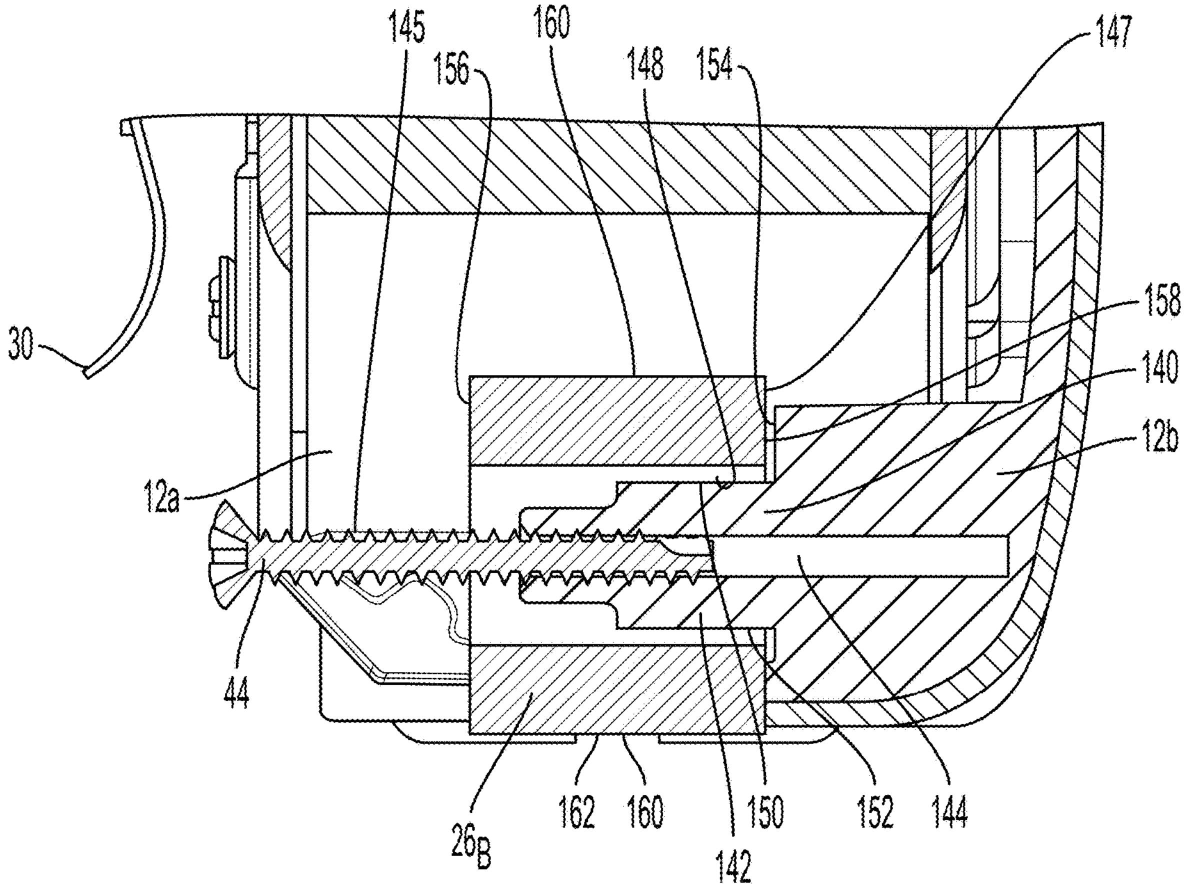
FIG. 8 shows a partial (bottom portion) cross-sectional view of the retractable rule assembly according to an embodiment of the present patent application, wherein the bottom manually engageable roller acting as the blade advancer is shown as being disposed in the housing portion.
Figure 9:
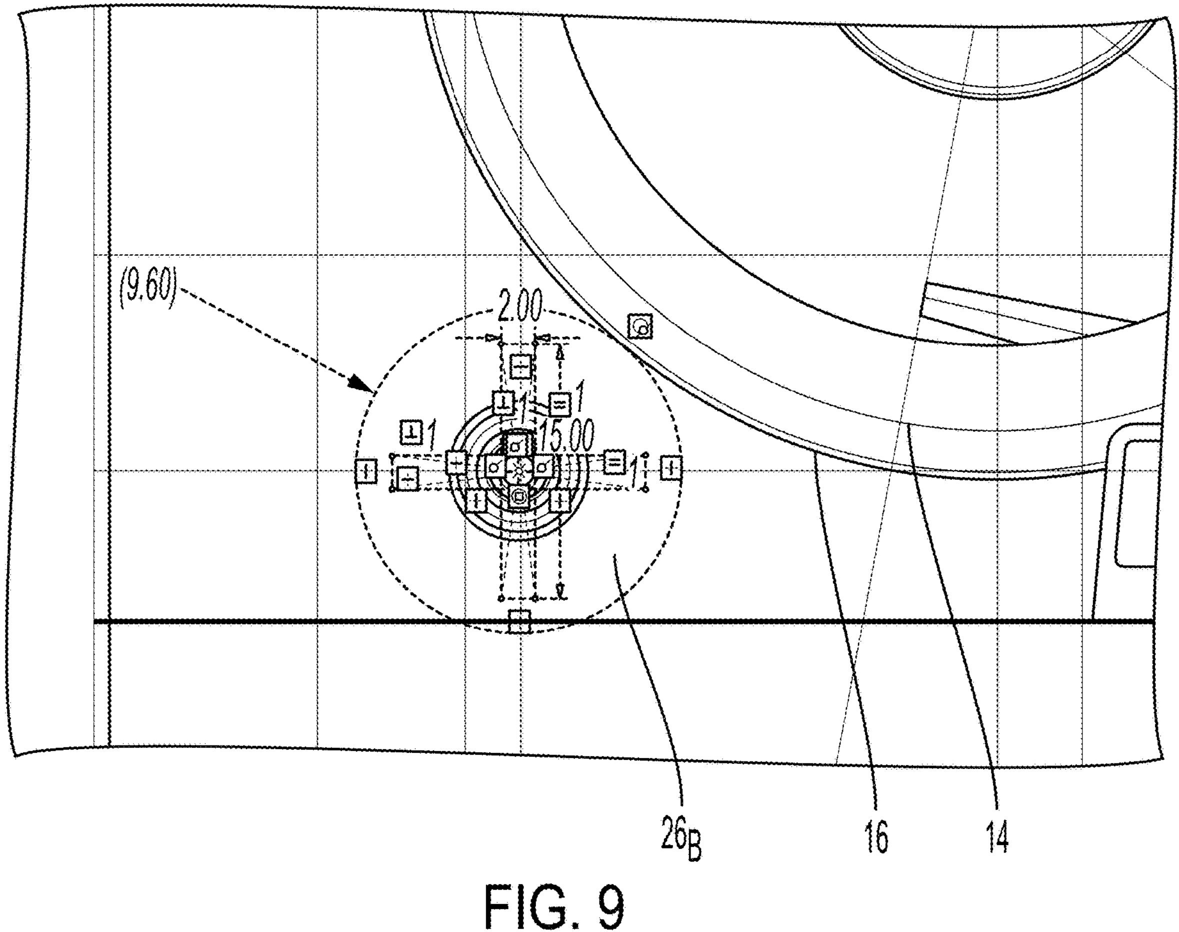
FIG. 9 shows an exemplary view of the retractable rule assembly according to an embodiment of the present patent application, wherein the bottom manually engageable roller acting as the blade advancer and the reel are shown adjacent to each other.

When the bottom roller $\mathbf{26}_B$ is disposed in the housing 12*b*, inner circumferential surfaces 150 of the opening 148 of the bottom roller $\mathbf{26}_B$ may be surround outer circumferential surfaces 152 of the protrusion 142. Also, when the bottom roller $\mathbf{26}_B$ is disposed in the housing 12*b*, end surfaces 147 (facing the second housing portion 12*b* and disposed at the second end portion 158) of the bottom roller $\mathbf{26}_B$ may be supported by surfaces 154 of the circumferential support portions 146. These configurations of the bottom roller $\mathbf{26}_B$ and the bottom roller support portion 140 enable the bottom roller $\mathbf{26}_B$ be supported by the bottom roller support portion 140. A clearance/gap may be provided between the outer circumferential surfaces 152 of the protrusion 142 and the inner circumferential surfaces 150 of the opening 148 of the bottom roller $\mathbf{26}_B$. This clearance/gap may enable the movement of the bottom roller $\mathbf{26}_B$ between its first and its second positions. A clearance/gap may also be provided between the end surfaces 147 (facing the second housing portion 12*b* and disposed at the second end portion 158) of the bottom roller $\mathbf{26}_B$ and the surfaces 154 of the circumferential support portions 146 to enable the movement of the bottom roller $\mathbf{26}_B$ between its first and its second positions. As shown in FIG. 8, the outer circumferential surfaces 152 of the protrusion 142 and the inner circumferential surfaces 150 of the opening 148 of the roller $\mathbf{26}_B$ may have stepped configurations and may be complementary to each other.

The opening 144 of the housing member 12*b* may be configured to align with an opening 145 of the other of the housing member 12*a*. The fastener 44 may then be positioned in aligned openings 144, 145 of the corner portion 36 of the housing member 12*a*, 12*b*. Thus, it can be appreciated that the housing members 12*a*, 12*b* may be secured together using fastener in this location. The fastener 44 may also enable the roller $\mathbf{26}_B$ be supported by the bottom roller support portion 140 and be secured in the housing 12.

The housing 12 may be configured to receive the bottom roller $\mathbf{26}_B$ therein such that at least a portion of the bottom roller $\mathbf{26}_B$ may be protruding slightly outwardly and away from the housing 12 and at least a portion of the bottom roller $\mathbf{26}_B$ may be disposed in the housing 12. A surface/portion 162 of the cylindrical side wall 160 of at least a portion of the bottom roller $\mathbf{26}_B$ protruding slightly outwardly and away from the housing 12 may form a manually engageable surface/portion 162 of the bottom roller $\mathbf{26}_B$. In another embodiment, the surface/portion 162 of the cylindrical side wall 160 of at least a portion of the bottom roller $\mathbf{26}_B$ may not protrude slightly outwardly and away from the housing 12 and the housing 12 may have an opening through which a user may engage the surface/portion 162 of the cylindrical side wall 160 of at least a portion of the bottom roller $\mathbf{26}_B$. That is, a user engaging the manually engageable surface/portion 162 of the bottom roller $\mathbf{26}_B$ may manually force the bottom roller $\mathbf{26}_B$ against the force of gravity and into engagement with the blade 16 and/or reel 14 and manually roll the bottom roller $\mathbf{26}_B$. This action may move the blade 16 in the direction that extends the blade 16 outwardly from the housing 12. A surface/portion 164 of the cylindrical side wall 160 of at least a portion of the bottom roller $26_B$ disposed in the housing 12 may form the blade and/or reel engageable surface/portion 164 of the bottom roller $26_B$. That is, the surface/portion 164 of the cylindrical side wall 160 of at least a portion of the bottom roller $26_B$ disposed in the housing 12 may be forced/moved into engagement with the blade 16 and/or reel 14 to move the blade 16 in the direction that extends the blade 16 outwardly from the housing 12.

The surfaces/portions 162 and 164 of the bottom roller $26_B$ may be disposed at an angle (between 90 and 180 degrees) with respect to each other. In another embodiment, the bottom roller $26_B$ may be disposed anywhere along the bottom of the retractable rule assembly 10. In such an embodiment, the surfaces/portions 162 and 164 of the bottom roller $26_B$ may form opposing surfaces of the bottom roller $26_B$. As the bottom roller $26_B$ may be manually rolled/rotated/moved, portions of the bottom roller $26_B$ that form the surfaces/portions 162, 164 may change. In general, the surface/portion 164 of the cylindrical side wall 16 of at least a portion of the bottom roller $26_B$ may be disposed in the housing 12, while the surface/portion 162 of the cylindrical side wall 160 of at least a portion of the bottom roller $26_B$ may be slightly protruding outwardly and away from the housing 12.

The blade advancer 24 may form part of the releasable blade lock assembly 84 as shown in FIGS. 10A-12D. The blade lock assembly 84 may be constructed and arranged to be manually actuated to lock the blade 16 in any position of extension outwardly of the housing opening 18 and to release the blade 16 from any position in which the blade 16 is locked. The structure and operation of the blade lock assembly 84 is explained in detail above. The blade lock assembly 84 may be movable in a first direction FD to lock the blade 16 and a second direction SD, opposite direction, to advance the blade 16 outwardly from the housing 12. For example, the blade advancer 24 may include a dual action slidelock is shown in and described in detail below with respect to FIGS. 10A-12D. The blade advancer 24 of FIGS. 10A-12D may have the same ergonomics as the blade lock assembly 84.

FIGS. 10A-10D show various views of the retractable rule assembly 10 where the blade advancer 24 may form part of the releasable blade lock assembly 84. The releasable blade lock assembly 84 is shown in a locked configuration in FIG. 10A and an unlocked configuration in FIG. 10B. The blade advancer 24 is shown in a spool/reel engaged configuration in FIG. 10C and in a blade extended configuration in FIG. 10D in which the blade 16 is advanced in the direction AD that extends the blade 16 outwardly from the housing 12.

Referring to FIGS. 10A-10D, the blade advancer 24 may include a first engaging portion 166 disposed on the blade lock assembly 84 and a second engaging portion 168 disposed on the reel 14. The first engaging portion 166 of the blade lock assembly 84 may be configured to interlock/interengage with the second engaging portion 168 of the reel 14 to facilitate the advancement/movement of the blade 16 in the direction AD (i.e., outwardly from the housing 12). The first engaging portion 166 may be in the form of a projection or a tooth 170. The first engaging portion 166 may interchangeably referred to as spool/reel interaction portion/tooth. The second engaging portion 168 may include teeth 172 that are configured to engage and interlock with the first engaging portion 166. The reel 14 may be modified to include the second engaging portion 168 including the teeth 172. The housing 12 may be modified to include a track for the blade lock assembly 84 to be slid/moved/rotated back in the reverse direction (i.e., the second direction SD). The modified track may enable the blade lock assembly 84 move/rotate/slide, in the second direction SD, past the unlock configuration/position. Although the first engaging portion 166 may be shown to include the projection/tooth 170 and the second engaging portion 168 may be shown to include the teeth 172, in other embodiments, the first engaging portion 166 and the second engaging portion 168 may include other interlocking/interengaging portions that are configured to enable the advancement/movement of the blade 16, in the direction AD, outwardly from the housing 12.

FIGS. 10A-10B show a lock and an unlock configurations of the blade lock assembly 84. The blade lock assembly 84 may be movable in the first direction FD to lock the blade 16 in any position of extension outwardly of the housing opening 18 and the second direction SD, opposite direction, to unlock the blade 16 from any position in which the blade 16 is locked. The lock and unlock configurations of the blade lock assembly 84 are explained in detail above.

To advance/move the blade 16 in the direction AD (i.e., outwardly from the housing 12), the releasable blade lock assembly 84 may be first slid/moved/rotated in the second direction SD. For example, the releasable blade lock assembly 84 may be slid/moved/rotated in the second direction SD from its lock configuration to its unlock configuration. As noted above, the second direction SD of the releasable blade lock assembly 84 may be opposite to the first direction FD of the releasable blade lock assembly 84. In the unlock configuration in FIG. 10B, the releasable blade lock assembly 84 may then be pushed into the housing 12 (i.e., in the inward radial direction as shown by the arrow ID). This pushing action may cause the first engaging portion 166 (e.g., the projection/tooth 170) of the releasable blade lock assembly 84 to interlock with the second engaging portion 168 (e.g., teeth 172) on the rim of the reel 14. The interlock engagement between the first engaging portion 166 (e.g., the projection/tooth 170) of the releasable blade lock assembly 84 and the second engaging portion 168 (e.g., teeth 172) on the rim of the reel 14 enables the reel 14 and the blade 16 to be moved along with the releasable blade lock assembly 84. In this interlocked (or spool/reel engaged) configuration as shown in FIG. 10C, and while maintaining (radial) pressure on the releasable blade lock assembly 84, the releasable blade lock assembly 84 may further be moved/slid/rotated in the second direction SD (from the unlock configuration of the blade lock assembly 84) to advance/move the blade 16 in the direction AD to extend the blade 16 outwardly from the housing 12. Once the blade 16 is moved/advanced in the direction AD to extend the blade 16 outwardly from the housing 12, the user may grab the end hook 20 and extend the blade 16 further outwardly from the housing 12 so as to engage a portion of the end hook 20 with a workpiece, or may engage a workpiece directly with the end hook 20 and allow the workpiece to anchor the blade 16 to permit one handed operation by a user.

The user may move/pull the releasable blade lock assembly 84 in an outward radial direction (i.e., opposite to the direction of the arrow ID) to release/disengage the interlock connection between the first engaging portion 166 (e.g., the projection/tooth 170) of the releasable blade lock assembly 84 and the second engaging portion 168 (e.g., teeth 172) on the rim of the reel 14. When there is an interlock engagement between the first engaging portion 166 (e.g., the projection/tooth 170) of the releasable blade lock assembly 84 and the second engaging portion 168 (e.g., teeth 172) on the rim of the reel 14 and when the releasable blade lock assembly 84 is moved in the second direction SD, the releasable blade lock assembly 84 may act as the blade advancer. When the interlock engagement between the first engaging portion 166 (e.g., the projection/tooth 170) of the releasable blade lock assembly 84 and the second engaging portion 168 (e.g., teeth 172) on the rim of the reel 14 is released/disengaged, the releasable blade lock assembly 84 may act as the releasable blade lock. That is, the releasable blade lock assembly 84 may then be moved back in the first direction FD to lock the blade 16 in any position of extension outwardly of the housing opening 18. The releasable blade lock assembly 84 may also be moved back in the first direction FD to the home position of the blade advancer 24 when the blade advancer's function is desired. The home position of the blade advancer 24 may include the unlock configuration/position of the releasable blade lock assembly 84.

In one embodiment, the blade advancer 24 of FIGS. 10A-10D may be configured to be spring-biased to return the releasable blade lock assembly 84 automatically from its interlock engagement configuration (i.e., in which the projection/tooth 170 of the releasable blade lock assembly 84 and the teeth 172 of the second engaging portion 168 on the rim of the reel 14 are in an interlock engagement) to a releasable blade lock configuration (i.e., in which the projection/tooth 170 of the releasable blade lock assembly 84 is released/disengaged from the teeth 172 of the second engaging portion 168 on the rim of the reel 14).

FIGS. 11A-11D show various views of the retractable rule assembly 10 where the blade advancer 24 may form part of the releasable blade lock assembly 84. The releasable blade lock assembly 84 is shown in a locked configuration in FIG. 11A and an unlocked configuration in FIG. 11B. The blade advancer 24 is shown in a friction pad engaged configuration in FIG. 11C and in a blade extended configuration in FIG. 11D in which the blade 16 is advanced in the direction AD that extends the blade 16 outwardly from the housing 12. The embodiment shown in FIGS. 11A-11D is similar to that descried in detail in FIGS. 10A-10D except for the differences noted below. The embodiment of the retractable rule assembly 10 as shown in FIGS. 11A-11D does not have any modifications to the spool/reel 14.

Referring to FIGS. 11A-11D, the blade advancer 24, which forms part of releasable blade lock assembly 84, may include a cam surface. The cam surface may be configured to force a friction pad (rubber push) feature 176 against the blade 16/reel 14.

To advance/move the blade 16 in the direction AD (i.e., outwardly from the housing 12), the releasable blade lock assembly 84 may be first slid/moved/rotated in the second direction SD. For example, the releasable blade lock assembly 84 may be slid/moved/rotated in the second direction SD from its lock configuration to its unlock configuration. As noted above, the second direction SD the releasable blade lock assembly 84 may be opposite to the first direction FD of the releasable blade lock assembly 84. In the unlock configuration in FIG. 11B, the releasable blade lock assembly 84 may then be pushed into the housing 12 (i.e., in the inward radial direction as shown by the arrow ID). This pushing action may cause the cam surface to force the friction pad (rubber push) feature 176 against the blade 16/reel 14. In this friction pad engaged configuration as shown in FIG. 11C, and while maintaining (radial) pressure on the releasable blade lock assembly 84, the releasable blade lock assembly 84 may further be moved/slid/rotated in the second direction SD (from the unlock configuration of the blade lock assembly 84) to advance/move the blade 16 in the direction AD to extend the blade 16 outwardly from the housing 12. Once the blade 16 is moved/advanced in the direction AD to extend the blade 16 outwardly from the housing 12, the user may grab the end hook 20 and may extend the blade 16 further outwardly from the housing 12 so as to engage a portion of the end hook 20 with a workpiece, or may engage a workpiece directly with the end hook 20 and allow the workpiece to anchor the blade 16 to permit one handed operation by a user. The blade advancer 24 of FIGS. 11A-11D may also include a detent in the cam surface that indicates a maximum extension of the blade advancer 24/the blade lock assembly 84 (in the second direction SD) to a user. After the user hooks the blade 16 on the workpiece, the user may pull the blade 16 to extend the blade 16. This may cause the blade advancer 24/the blade lock assembly 84 to travel past the detent, where the cam surface releases the friction pad feature from the blade 16/reel 14. The releasable blade lock assembly 84 may also be moved back in the first direction FD to the home position of the blade advancer 24 when the blade advancer's function is desired. The home position of the blade advancer 24 may include the unlock configuration/position of the releasable blade lock assembly 84.

In one embodiment, the blade advancer 24 of FIGS. 11A-11D may be configured to be spring-biased to return the releasable blade lock assembly 84/the blade advancer 24 automatically from its friction pad engaged configuration (i.e., as shown in FIGS. 11C and 11D) to its releasable blade lock configuration (in which its friction pad is disengaged from the rim of the reel 14, for example, as shown in FIGS. 11A and 11B).

It may be appreciated that a cam surface "track" could drive the friction pad against the blade 16 and/or reel 14. In such a configuration, the user may not need to exert as much downward force (radial) as the lock assembly 84 is pulled back. This being said, in some embodiments, the user must exert some radial force at the start of the extend operation, otherwise the cam follower could travel in the return path.

Referring to the embodiment in FIGS. 10A-11D, the "braking" feature is added to the blade lock assembly 84, this feature enables engaging of the spool and may work similar to a finger brake (thumb brake). In some embodiments, the braking feature may simply push radially on blade lock assembly 84 so that the friction pad drags on the spool/tape. As the tape is retracting via the spring, the user can push down on the button and slow or stop retraction, depending on the radial force used.

FIGS. 12A-12D show various views of the retractable rule assembly 10 where the blade advancer 24 may form part of the releasable blade lock assembly 84. The releasable blade lock assembly 84 is shown in a locked configuration in FIG. 12A and an unlocked configuration in FIG. 12B. The blade advancer 24 is shown in a releasable blade lock configuration in FIG. 12C and in a blade extended configuration in FIG. 12D in which the blade 16 is advanced in the direction AD that extends the blade 16 outwardly from the housing 12. The embodiment shown in FIGS. 12A-12D is similar to that descried in detail in FIGS. 10A-10D and FIGS. 11A-11D except for the differences noted below. The embodiment shown in FIGS. 12A-12D does not have any modifications to the spool/reel 14.

Referring to FIGS. 12A-12D, the blade advancer 24, which forms part of releasable blade lock assembly 84, may include an end hook pusher 178. The end hook pusher 178 may be formed from spring steel and be a spring steel pusher or a spring steel member. In other embodiments the end hook pusher 178 may be formed from plastic or so on. In some embodiment the end hook pusher 178 may be formed as an assembly, such as from links of chain, or any other appropriate collectively flexible member (e.g., with rigidity when pushed, yet flexibility when pulled). The end hook pusher 178 may be configured to engage with the end hook 20 (i.e., connected to the distal end 28 of the blade 16) to push the end hook 20 (and the blade 16 connected thereto) outwardly from the housing 12, that is in the direction AD. It may be appreciated that in some embodiments the user may push in a button of the blade lock assembly 84 to get past the unlocked position, before sliding the blade lock assembly 84 back. This extends the end hook pusher 178 which in turn pushes the hook and extends the blade against the spring bias. User can then hook on a workpiece single-handedly or pull on the blade to extend it further. The pusher could retract via the spring bias or manually in various embodiments.

To advance/move the blade 16 in the direction AD (i.e., outwardly from the housing 12), the releasable blade lock assembly 84 may be first slid/moved/rotated in the second direction SD. For example, the releasable blade lock assembly 84 may be slid/moved/rotated in the second direction SD from its lock configuration to its unlock configuration. As noted above, the second direction SD the releasable blade lock assembly 84 may be opposite to the first direction FD of the releasable blade lock assembly 84. Comparing the lock configuration in FIG. 12A and the unlock configuration of FIG. 12B shows that the sliding/movement/rotation of the releasable blade lock assembly 84 in the second direction SD causes the movement of the end hook pusher 178. FIG. 12B shows the end hook pusher 178 engaging with the end hook 20 of the blade 16. In the unlock configuration in FIG. 12B, the releasable blade lock assembly 84 may then be pushed into the housing 12 (i.e., in the inward radial direction as shown by the arrow ID). This pushing action allows movement of the end hook pusher 178 to rotate and engage with the end hook 20 of the blade 16. In the configuration as shown in FIG. 12C, and while maintaining (radial) pressure on the releasable blade lock assembly 84, the releasable blade lock assembly 84 may further be moved/slid/rotated in the second direction SD (from the unlock configuration of the blade lock assembly 84) to advance/move the blade 16 in the direction AD to extend the blade 16 outwardly from the housing 12. Once the blade 16 is moved/advanced in the direction AD to extend the blade 16 outwardly from the housing 12, the user may grab the end hook 20 and may extend the blade 16 further outwardly from the housing 12 so as to engage a portion of the end hook 20 with a workpiece, or may engage a workpiece directly with the end hook 20 and allow the workpiece to anchor the blade 16 to permit one handed operation by a user. After the user hooks the blade 16 on the workpiece, the user may pull the blade 16 to extend the blade 16. The releasable blade lock assembly 84 may also be moved back in the first direction FD to the home position of the blade advancer 24 when the blade advancer's function is desired. The home position of the blade advancer 24 may include the unlock configuration/position of the releasable blade lock assembly 84.

In one embodiment, the blade advancer 24 of FIGS. 12A-12D may be configured to be spring-biased to return the releasable blade lock assembly 84/the blade advancer 24 automatically from its configuration (i.e., as shown in FIGS. 12C and 12D) to its releasable blade lock configuration (as shown in FIG. 12B).

The blade advancer 24 may be a spring biased blade advancer $\mathbf{26}_{SB}$. For example, the blade advancer $\mathbf{26}_{SB}$ may include a microSD (i.e., a type of removable flash memory card used for storing information) type configuration (as shown in and described in detail below with respect to FIGS. 13-15). The spring biased blade advancer $\mathbf{26}_{SB}$ may comprise a pusher 180 and a spring 182. The blade advancer $\mathbf{26}_{SB}$ may be constructed and arranged such that when the blade advancer $\mathbf{26}_{SB}$ is actuated, the spring 182 pushes the pusher 180 to engage a portion of the blade 16, the end hook 20 (though some may interpret the blade 16 as including the end hook 20), or the reel 14 against a bias of the coil spring 22 to advance the blade 16 in the direction AD that extends the blade 16 outwardly from the housing 12. The pusher 180, when moved by the spring 182, contacts the end hook 20 to extend the blade 16 outwardly from the housing 12 that is in the direction AD.

The pusher 180 may interchangeably be referred to as a blade feeder. The pusher 180 may be configured to support a portion of the blade 16 thereon. The pusher 180 may be constructed of, for example, a molded plastic material. The pusher 180 may be configured to be movable with respect to the housing 12. The pusher 180 may be configured to be movably connected to a portion of the housing 12. The pusher 180 may be operatively connected to the spring 182. When the blade advancer $\mathbf{26}_{SB}$ is actuated, the spring 182 may be configured to push the pusher 180 (e.g., in the direction AD) to engage a portion of the blade 16/the reel 14 against the bias of the coil spring 22 to advance the blade 16 in the direction AD that extends the blade 16 outwardly from the housing 12.

The spring 182 may interchangeably be referred to as an extension/a tension spring in some nonlimiting embodiments (i.e., the spring is designed to operate with a tension load, so the spring stretches as the load is applied to it). The extension spring 182 may be constructed and arranged to become extended under load. The turns/loops/coils of the extension spring 182 may normally be touching each other in the unloaded position/configuration. The spring 182 may have a hook, eye or some other means of attachment at each end. One end of the spring 182 may be connected to a portion of the housing 12 and the other end of the spring 182 may be connected to a portion of the pusher 180. It may be appreciated, however, that in various embodiments the spring can be extended, compressed, or twisted to generate a spring force that may power popping out the blade 16 when the pusher 180 is pressed into the housing 12. It may further be appreciated that the blade 16 may extend from the housing 12 by a distance that is greater than (e.g., a multiple of) the insertion distance that deforms the spring.

A spring force of the blade advancer spring 182 may be sufficiently large to overcome the spring force of the coil spring 22 retracting the blade 16 into the housing 12. The blade advancer $\mathbf{26}_{SB}$ may remain extended until manually forced to a retracted position. The blade advancer $\mathbf{26}_{SB}$ may also serve as a shock absorber against rapid retraction of the blade 16 while in the extended position. The blade advancer $\mathbf{26}_{SB}$ may also serve as additional finger support while in the extended position. To retract the pusher 180 of the blade advancer $\mathbf{26}_{SB}$ into the housing 12, the pusher 180 may simply be pressed back into the housing 12. The blade advancer $\mathbf{26}_{SB}$ may be configured to provide a pop out blade presentation and to provide soft close (retracting the pusher 180 of the blade advancer $\mathbf{26}_{SB}$ into the housing 12) configuration. The blade advancer $\mathbf{26}_{SB}$ may include a push-push style ejection system (or push-push type connector). For the push-push type style ejection system, the blade 16/the end hook 20 may be inserted into the housing 12 and may be extracted from housing 12 by pushing the pusher 180/the blade 16/the end hook 20 in an insertion direction (that is opposite to the direction AD). The pusher 180 may be pushed into the housing 12 by approximately ¼ inch, this may cause the blade 16 to pop out by approximately 1¼ inch.

In another embodiment, the blade advancer $\mathbf{26}_{SB}$ may include a push-pull style ejection system (or push-pull type connector). For the push-pull style ejection system, the blade 16 may be extracted from the housing 12 by applying a force to the pusher 180/the blade 16/the end hook 20 in a direction opposite to the insertion direction.

Figure 16:
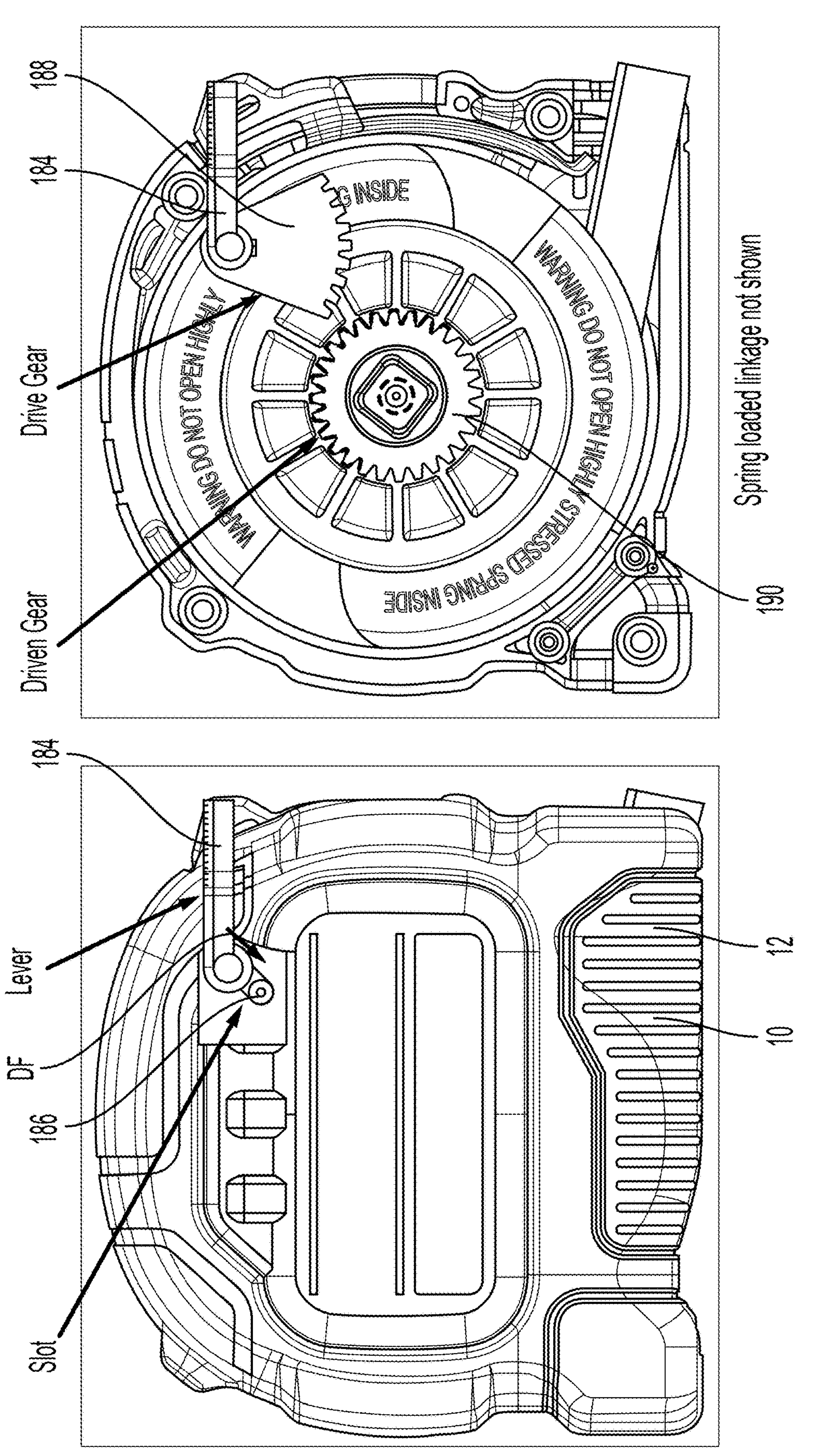
FIGS. 16 and 17 show a retractable rule assembly that may be configured to automatically extend the blade with a press of a button or the engagement of a lever according to an embodiment of the present patent application.
Figure 17:
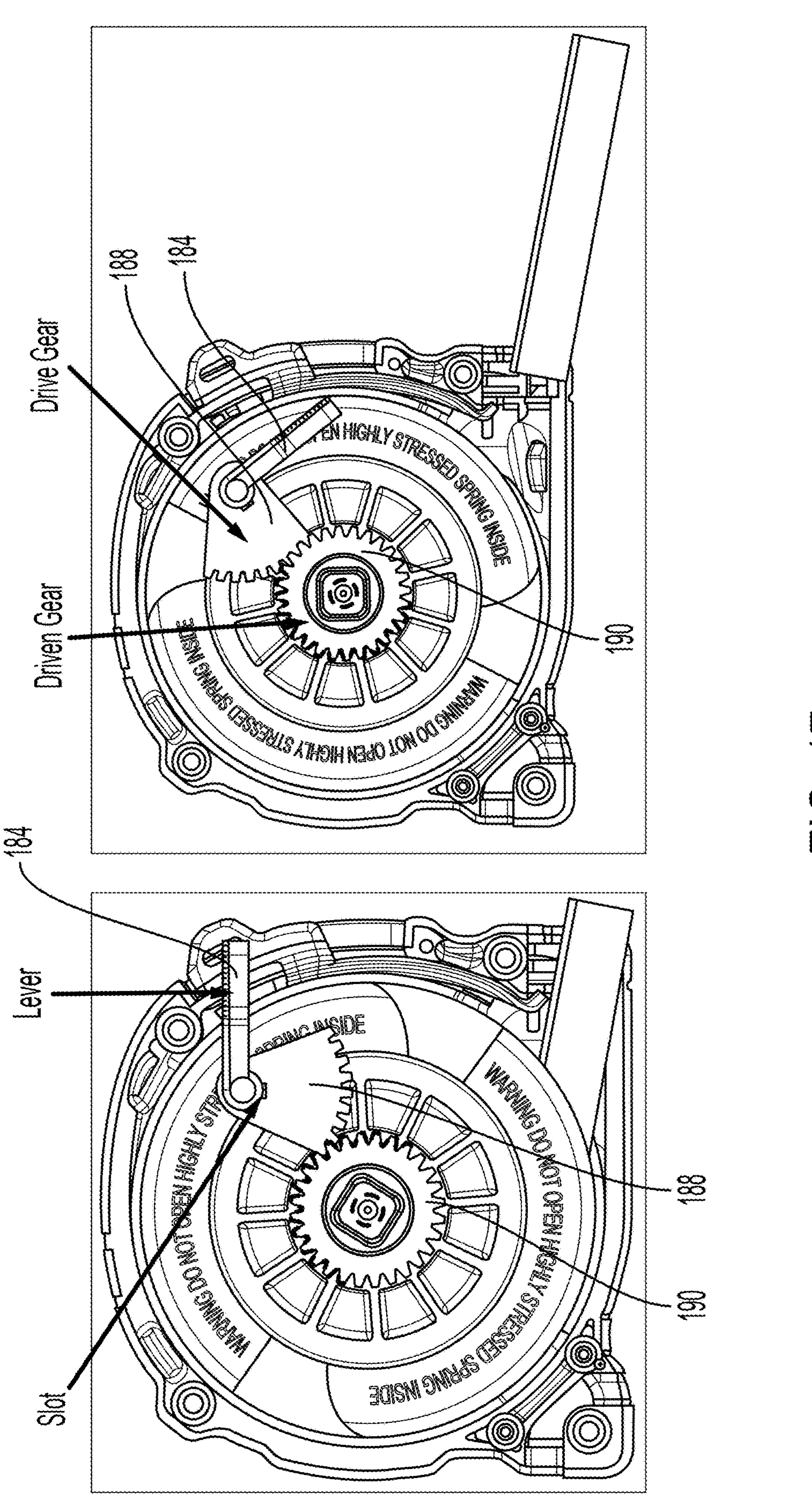

The present patent application provides an auto-extension tape measure 10 as shown in and described in detail with respect to FIGS. 16-17. FIGS. 16 and 17 show a retractable rule assembly or tape measure 10 that may be configured to automatically extend the blade 16 with a press of a button or the engagement of a lever 184.

A mechanism, both internal and external to the tape measure 10, may engage with the internal tape measure components to extend the blade 16 out of the tape measure 10. The mechanism may be made operational by actuation of a user/manually engageable feature (e.g., lever 184 or a button) on the exterior of the tape measure 10. As will be clear from the discussions below, the mechanical engagement of the manually engageable feature may interact with the internal components of the tape measure 10, forcing the blade 16 out of the mouth/blade opening 18 of the tape measure 10 to a distance set by the amount of engagement of the manually engageable feature. The release of this mechanism may return the components of the tape measure 10 to the rest position allowing the internal components of the tape measure 10 to move freely.

FIG. 16 shows the lever 184 in its rest position/configuration, while FIG. 17 shows the lever 184 in its operational position/configuration. A downward force (e.g., in the direction of an arrow DF) slides the lever 185 (from its rest position/configuration) along the slot 186 to its operational position/configuration. This causes an engagement between a drive gear 188 and a driven gear 190. The present patent application provides a tape rule pop out blade 16 where an external mechanism (e.g., the lever 184) translates a push action into rotation of the tape reel 14, so as to ease grabbing the end hook 20 and the blade 16 for further extension. For example, the spring-loaded lever 184, external to the tape measure 10, may manually engaged by the user. Upon engagement of the lever 184, the lever assembly may slide along the slot 186 designed into the tape measure case/housing 12. The lever 184 may be fixed to the gear 188 internal to the tape measure 10. At the bottom of the slot 186, the internal gear 188 that is fixed to the spring-loaded lever 184 may become engaged with a secondary gear 190 that is fixed to the cartridge/reel 14 of the tape measure 10. The secondary gear 190 may interchangeably referred to as the driven gear and the internal gear 188 may interchangeably referred to as the drive gear. Upon rotation of the gear 190, activated by the lever 184, the cartridge/reel 14 may rotate that extends the blade 16 outwards. Upon release of the lever 184, a spring activated linkage internal to the tape measure case/housing 12 may pull the lever 184 and the gear assembly back to its rest position, allowing the cartridge/reel 14 to rotate freely.

The present patent application may use a lever, a push-button, a gear, or a friction wheel, etc. to effectuate the movement of the reel 14, but the present patent application may use any other mechanism (e.g., an external mechanism) on a spring-retractable tape measure 10 to translate a push action into rotation of the tape reel 14 so as to ease grabbing the end hook 20 and the blade 16 for further extension.

At least some portions (e.g., where the user's palm, fingers and/or thumb may generally be in overlying relation with the housing 12) of the housing portions **12*a* and 12*b* may be covered with, for example, the overmolded rubber material or a rubber-like polymeric material. For example, the housing portions 12*a* and 12*b*** may have outer user engageable portions/surfaces (or gripping areas) that may be covered with, for example, the overmolded rubber material or a rubber-like polymeric material.

A bottom wall of the housing 12 may provide a finger grip enhancing configuration for a gripping hand of the user. The bottom wall may have a forward end portion disposed adjacent to the blade opening 18 and a rearward end portion at the opposite end of the bottom wall. A portion of the bottom wall (i.e., between the forward and the rearward end portions) may be generally recessed to provide the finger grip enhancing configuration for the gripping hand of the user. The gripping area on the bottom wall of the housing 12 may be covered with, for example, the overmolded rubber material or a rubber-like polymeric material. It can thus be appreciated that the housing 12 is constructed to be easily held in one hand of a user such that the user's fingers may engage the finger grip enhancing portion and the user's palm and thumb may generally be in overlying relation with a top portion of the housing 12. A peripheral portion of housing 12 may also be provided with a coating around gripped portions of the housing 12 to provide increased frictional engagement between the housing 12 and a user's hand and to provide a relatively soft comfortable surface for the user's hand. The coating may be made from, for example, a rubber-like material.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In one embodiment, dimensions/numerical ratios or ranges of the present patent application may be up to 5 percent, 10 percent, 15 percent or 20 percent greater than or up to 5 percent, 10 percent, 15 percent or 20 percent less than the values described throughout the present patent application. In another embodiment, dimensions/numerical ratios or ranges of the present patent application may be in the range of +/−5 percent or +/−10 percent of the values described throughout the present patent application.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A retractable rule assembly comprising:

a housing;

a reel rotatably mounted in the housing;

an elongated blade wound on the reel and constructed and arranged to extend outwardly through an opening in the housing;

a hook positioned on a distal end of the blade;

a coil spring configured to rotate the reel in the housing assembly in a direction to wind up the elongated blade when extending outwardly of the housing; and a blade advancer constructed and arranged to be manually engaged and moved relative to the housing and into contact with the blade and/or the reel, the blade advancer being movable against a bias of the coil spring to advance the blade in a direction that extends the blade outwardly from the housing.

2. The retractable rule assembly of claim 1, wherein the blade advancer comprises a manually engageable roller.

3. The retractable rule assembly of claim 2, further comprising a spring that biases the roller away from the blade and/or reel, and wherein the roller is configured be manually forced against the bias of the spring and into engagement with the blade and/or reel and manually rolled to move the blade in the direction that extends the blade outwardly from the housing.

4. The retractable rule assembly of claim 2, the roller is disposed above the blade and is normally held away from the blade.

5. The retractable rule assembly of claim 2, wherein the roller is disposed below the blade and is normally held away from the blade under the force of gravity.

6. The retractable rule assembly of claim 1, wherein the blade advancer forms part of a releasable blade lock assembly, the blade lock assembly constructed and arranged to be manually actuated to lock the blade in any position of extension outwardly of the housing opening and to release the blade from any position in which it is locked.

7. The retractable rule assembly of claim 6, wherein the blade lock assembly is movable in a first direction to lock the blade and a second direction, opposite direction, to advance the blade.

8. The retractable rule assembly of claim 7, wherein the blade advancer includes a first engaging portion disposed on the blade lock assembly and a second engaging portion disposed on the reel, wherein the first engaging portion of the blade lock assembly is configured to interlock with the second engaging portion of the reel to facilitate advancement of the blade in the direction that extends the blade outwardly from the housing, and wherein the first engaging portion includes a projection and the second engaging portion includes teeth that are configured to engage and interlock with the projection.

9. The retractable rule assembly of claim 7, wherein the blade advancer, which forms part of releasable blade lock assembly, includes a cam surface, and wherein the cam surface is configured to force a friction pad feature against the blade/reel to facilitate advancement of the blade in the direction that extends the blade outwardly from the housing.

10. The retractable rule assembly of claim 7, wherein the blade advancer, which forms part of releasable blade lock assembly, includes an end hook pusher, wherein the end hook pusher is configured to engage with the hook positioned on the distal end of the blade to push the hook and the blade connected thereto outwardly from the housing.

11. The retractable rule assembly of claim 1, wherein the blade advancer includes a manually engageable portion disposed on the housing and moveable along a slot disposed on the housing, a drive gear operatively connected to the manually engageable portion, and a driven gear operatively connected to the reel.

12. The retractable rule assembly of claim 11, wherein the manually engageable portion includes a rest configuration and an operational configuration, wherein, when the manually engageable portion is in its rest configuration, there is no engagement between the drive gear and the driver gear, and wherein, when the manually engageable portion is in its operational configuration, the drive gear and the driver gear are configured to engage with each other so as to rotate the reel.

13. The retractable rule assembly of claim 12, wherein, when a force is applied on the manually engageable portion, the manually engageable portion is moved along the slot from its rest configuration to its operational position, and wherein, when the manually engageable portion is in its operational configuration, the drive gear and the driver gear are configured to engage with each other to facilitate the rotation of the reel and the advancement of the blade in the direction that extends the blade outwardly from the housing.

14. The retractable rule assembly of claim 13, wherein the manually engageable portion includes a spring-biased manually engageable lever.

15. A retractable rule assembly comprising:

a housing;

a reel rotatably mounted in the housing;

an elongated blade wound on the reel and constructed and arranged to extend outwardly through an opening in the housing;

a coil spring configured to rotate the reel in the housing assembly in a direction to wind up the elongated blade when extending outwardly of the housing; and a spring biased blade advancer, the spring biased blade advancer comprising a pusher and a spring, the blade advancer being constructed and arranged such that when actuated, the spring pushes the pusher to engage a portion of the blade or the reel against a bias of the coil spring to advance the blade in a direction that extends the blade outwardly from the housing.

16. The rule assembly of claim 15, wherein the blade comprises a hook, and wherein the pusher, when moved by the spring, contacts the hook to extend the blade outwardly from the housing.

17. The rule assembly of claim 15, wherein a spring force of the blade advancer spring is sufficiently large to overcome the spring force of the coil spring retracting the blade into the housing.

18. The rule assembly of claim 15, wherein the blade advancer remains extended until manually forced to a retracted position.

19. The rule assembly of claim 18, wherein the blade advancer serves as a shock absorber against rapid retraction of the blade while in the extended position.

20. The rule assembly of claim 19, wherein the blade advancer serves as additional finger support while in the extended position.

* * * * *